United States Patent
Dukes et al.

(10) Patent No.: US 11,351,652 B2
(45) Date of Patent: Jun. 7, 2022

(54) POLYSILOCARB BINDERS AND COATINGS

(71) Applicant: Melior Innovations, Inc., Houston, TX (US)

(72) Inventors: Douglas M. Dukes, Troy, NY (US); Michael J. Mueller, Katy, TX (US); Michael Molnar, Houston, TX (US); Brian L. Benac, Hadley, NY (US)

(73) Assignee: Melior Innovations, Inc., Houston, TX (US)

( * ) Notice: Subject to any disclaimer, the term of this patent is extended or adjusted under 35 U.S.C. 154(b) by 0 days.

(21) Appl. No.: 15/454,846

(22) Filed: Mar. 9, 2017

(65) Prior Publication Data
US 2017/0368668 A1    Dec. 28, 2017

Related U.S. Application Data

(63) Continuation-in-part of application No. 14/634,814, filed on Feb. 28, 2015, now Pat. No. 10,167,366, and a continuation-in-part of application No. 14/634,819, filed on Feb. 28, 2015, now abandoned, and a continuation-in-part of application No. 14/268,150, filed on May 2, 2014, now Pat. No. 9,815,943.

(60) Provisional application No. 62/306,460, filed on Mar. 10, 2016, provisional application No. 61/946,598, filed on Feb. 28, 2014, provisional application No. 61/818,981, filed on May 3, 2013, provisional application No. 61/818,906, filed on May 2, 2013.

(51) Int. Cl.
| | |
|---|---|
| *B24D 3/28* | (2006.01) |
| *C04B 35/56* | (2006.01) |
| *C04B 35/571* | (2006.01) |
| *C08G 77/12* | (2006.01) |
| *C08L 83/04* | (2006.01) |
| *C09K 8/80* | (2006.01) |
| *C04B 35/622* | (2006.01) |
| *C08G 77/20* | (2006.01) |

(52) U.S. Cl.
CPC ............ *B24D 3/28* (2013.01); *C04B 35/5603* (2013.01); *C04B 35/571* (2013.01); *C04B 35/62222* (2013.01); *C08G 77/12* (2013.01); *C08L 83/04* (2013.01); *C09K 8/805* (2013.01); *C04B 2235/3826* (2013.01); *C04B 2235/483* (2013.01); *C08G 77/20* (2013.01)

(58) Field of Classification Search
CPC ............................... C08G 77/12; C08G 77/20
See application file for complete search history.

(56) References Cited

U.S. PATENT DOCUMENTS

| | | |
|---|---|---|
| 4,833,220 A | 5/1989 | Frey |
| 4,877,820 A | 10/1989 | Cowan |
| 5,130,400 A | 7/1992 | Pachaly |
| 5,225,283 A | 7/1993 | Leung |
| 5,356,471 A | 10/1994 | Reynders |
| 9,815,943 B2 | 11/2017 | Sherwood |
| 9,815,952 B2 | 11/2017 | Luesch |
| 10,221,660 B2 | 3/2019 | Salsich |
| 11,167,366 B2 | 11/2021 | Salsich |
| 2003/0137737 A1 | 7/2003 | Phillips |
| 2004/0166308 A1 | 8/2004 | Raksha |
| 2005/0006794 A1* | 1/2005 | Kashiwagi .............. C08L 83/04 257/788 |
| 2005/0154082 A1 | 7/2005 | DeLuca |
| 2006/0022198 A1 | 2/2006 | Shin-Etsu |
| 2006/0225609 A1 | 10/2006 | Rueger |
| 2007/0212487 A1 | 9/2007 | Anselmann |
| 2011/0311767 A1* | 12/2011 | Elahee ..................... C08K 5/11 428/138 |
| 2012/0261606 A1 | 10/2012 | Hollman |
| 2015/0252166 A1 | 9/2015 | Dukes |
| 2015/0252170 A1 | 9/2015 | Diwanji |
| 2015/0252171 A1 | 9/2015 | Molnar |
| 2016/0176223 A1 | 6/2016 | Degott |
| 2017/0183514 A1 | 6/2017 | Benac |
| 2017/0253720 A1 | 9/2017 | Hopkins |
| 2017/0368668 A1 | 12/2017 | Dukes |
| 2018/0194945 A1 | 7/2018 | Hopkins |
| 2018/0201115 A1 | 7/2018 | Venturi |

FOREIGN PATENT DOCUMENTS

| | | |
|---|---|---|
| CN | 201110211590.9 | 12/2011 |
| WO | WO 2009/133765 | 5/2009 |

OTHER PUBLICATIONS

Mar. 21, 2018, Chinese Patent Office, Translation of Office Action Appl No. 201500230118.6.
Nov. 30, 2017, EPO, Search Report Appl. No. 15755897.4.
2006, Dhoke, Performance of black pigments incorporated in.
Dec. 14, 2017, PCT, Search Report Appl. No. PCT/US17/50780.
Dec. 14, 2017, PCT, Opinion Appl. No. PCT/US17/50780.

* cited by examiner

*Primary Examiner* — Robert C Boyle
(74) *Attorney, Agent, or Firm* — C. Tumey Law Group PLLC

(57) ABSTRACT

Silicon (Si) based high temperature coatings and base materials and methods of making those materials. More specifically, methods and materials having silicon, oxygen and carbon containing polymer derived ceramic liquids that form filled and unfiled coatings, including high temperature crack resistant coatings.

50 Claims, 3 Drawing Sheets

POLYSILOCARB BINDERS AND COATINGS

This application: (i) claims under 35 U.S.C. § 119(e)(1), the benefit of the filing date of U.S. provisional application Ser. No. 62/306,460 filed Mar. 10, 2016; (ii) is a continuation-in-part of U.S. patent application Ser. No. 14/268,150 filed May 2, 2014, which claims, under 35 U.S.C. § 119(e)(1), the benefit of the filing date of U.S. provisional application Ser. No. 61/818,906 filed May 2, 2013 and the benefit of the filing date of U.S. provisional application Ser. No. 61/818,981 filed May 3, 2013; (iii) is a continuation-in-part of U.S. patent application Ser. No. 14/634,814 filed Feb. 28, 2015; which claims, under 35 U.S.C. § 119(e)(1), the benefit of the filing date of U.S. provisional application Ser. No. 61/946,598 filed Feb. 28, 2014; (iv) is a continuation-in-part of U.S. patent application Ser. No. 14/634,819 filed Feb. 28, 2015, the entire disclosures of each of which are incorporated herein by reference.

BACKGROUND OF THE INVENTION

Field of the Invention

The present inventions relate to polyorganic compositions, structures and materials; polymer derived preceramic and ceramic materials; and in particular polysilocarb compositions, structures and materials. The present inventions further relate to coatings, films and coating bases made from these compositions and materials. In particular, embodiments of the present inventions include: black ceramics having silicon, oxygen and carbon; polysilocarb coatings; polysilocarb coatings having these black ceramics; polysilocarb coatings having other additives, colorants and colored pigments; polymer derived ceramic coatings; and, polysilocarb coatings that are free from having any pigments, fillers or other additives; methods of making these; and devices, structures and apparatus that have, or are coated with, or otherwise utilize, these compositions as for example paints, inks, coatings, layers and adhesives.

As used herein, unless stated otherwise, the terms "color," "colors" "coloring" and similar such terms are be given their broadest possible meaning and would include, among other things, the appearance of the object or material, the color imparted to an object or material by an additive, methods of changing, modifying or affecting color, the reflected refracted and transmitted wavelength(s) of light detected or observed from an object or material, the reflected refracted and transmitted spectrum(s) of light detected or observed from an object or material, all colors, e.g. white, grey, black, red, violet, amber, almond, orange, aquamarine, tan, forest green, etc., primary colors, secondary colors, and all variations between, and the characteristic of light by which any two structure free fields of view of the same size and shape can be distinguish between.

As used herein, unless stated otherwise, the terms "black", "blackness", and similar such terms, are to be given there broadest possible meanings, and would include among other things, the appearance of an object, color, or material: that is substantially the darkest color owing to the absence, or essential absence of, or absorption, or essential abortion of light; where the reflected refracted and transmitted spectrum(s) of light detected or observed from an object or material has no, substantially no, and essentially no light in the visible wavelengths; the colors that are considered generally black in any color space characterization scheme, including the colors that are considered generally black in L a b color space, the colors that are considered generally black in the Hunter color space, the colors that are considered generally black in the CIE color space, and the colors that are considered generally black in the CIELAB color space; any color, or object or material, that matches or substantially matches any Pantone® color that is referred to as black, including PMS 433, Black 3, Black 4, Black 5, Black 6, Black 7, Black 2 2x, Black 3 2x, Black 4 2x, Black 5 2x, Black 6 2x, Black 7 2x, 412, 419, 426, and 423; values on a Tri-stimulus Colorimeter of X=from about 0.05 to about 3.0; Y=from about 0.05 to about 3.0, and Z=from about 0.05 to about 3.0; in non glossy formulations; a CIE L a b of L=less than about 40, less than about 20, less than about 10, less than about 1, and about zero, of "a"=of any value; of "b"=of any value; and a CIE L a b of L=less than 50 and b=less than 1.0; an L value less than 30, a "b" value less than 0.5 (including negative values) and an "a" value less than 2 (including negative values); having a jetness value of about 200 $M_y$ and greater, about 250 $M_y$ and greater, 300 $M_y$ and greater, and greater; having an L=40 or less and a My of greater than about 250; having an L=40 or less and a My of greater than about 300; having a dM value of 10; having a dM value of −15; and combinations and variations of these.

As used herein, unless stated otherwise, the term "gloss" is to be given its broadest possible meaning, and would include the appearance from specular reflection. Generally the reflection at the specular angle is the greatest amount of light reflected for any specific angle. In general, glossy surfaces appear darker and more chromatic, while matte surfaces appear lighter and less chromatic.

As used herein, unless stated otherwise, the term "Jetness" is to be given its broadest possible meaning, and would include among other things, a Color independent blackness value as measured by $M_y$ (which may also be called the "blackness value"), or $M_c$, the color dependent blackness value, and $M_y$ and Me values obtained from following DIN 55979 (the entire disclosure of which is incorporated herein by reference).

As used herein, unless stated otherwise, the term "undertone," "hue" and similar such terms are to be given their broadest possible meaning, and would include among other things.

As used herein, unless stated otherwise, the terms "visual light," "visual light source," "visual spectrum" and similar such terms refers to light having a wavelength that is visible, e.g., perceptible, to the human eye, and includes light generally in the wave length of about 390 nm to about 770 nm.

As used herein, unless stated otherwise, the term "paint" is to be given its broadest possible meaning, and would include among other things, a liquid composition that after application as a thin layer to a substrate upon drying forms a thin film on that substrate, and includes all types of paints such as oil, acrylic, latex, enamels, varnish, water reducible, alkyds, epoxy, polyester-epoxy, acrylic-epoxy, polyamide-epoxy, urethane-modified alkyds, and acrylic-urethane.

As used herein, unless stated otherwise, the term "plastic" is to be given its broadest possible meaning, and would include among other things, synthetic or semi-synthetic organic polymeric materials that are capable of being molded or shaped, thermosetting, thermoforming, thermoplastic, orientable, biaxially orientable, polyolefins, polyamide, engineering plastics, textile adhesives coatings (TAC), plastic foams, styrenic alloys, acrylonitrile butadiene styrene (ABS), polyurethanes, polystyrenes, acrylics, polycarbonates (PC), epoxies, polyesters, nylon, polyethylene, high density polyethylene (HDPE), very low density polyethylene (VLDPE), low density polyethylene (LDPE), polypropylene (PP), polyvinyl chloride (PVC), polyethylene terephthalate (PET), polybutylene terephthalate (PBT), poly ether ethyl ketone (PEEK), polyether sulfone (PES), bis maleimide, and viscose (cellulose acetate).

As used herein, unless stated otherwise, the term "ink" is to be given its broadest possible meaning, and would include among other things, a colored liquid for marking or writing, toner (solid, powder, liquid, etc.) for printers and copiers, and colored solids that are used for marking materials, pigment ink, dye ink, tattoo ink, pastes, water-based, oil-based, rubber-based, and acrylic-based.

As used herein, unless stated otherwise, the term "nail polish" and similar such terms, are to be given its broadest term, and would include all types of materials, coatings and paints that can be applied to, or form a film, e.g., a thin film, on the surface of a nail, including natural human nails, synthetic "fake" nails, and animal nails.

As used herein, unless stated otherwise, the term "adhesive" is to be given its broadest possible meaning, and would include among other things, substances (e.g., liquids, solids, plastics, etc.) that are applied to the surface of materials to hold them together, a substance that when applied to a surface of a material imparts tack or stickiness to that surface, and includes all types of adhesives, such as naturally occurring, synthetic, glues, cements, paste, mucilage, rigid, semi-rigid, flexible, epoxy, urethane, methacrylate, instant adhesives, super glue, permanent, removable, and expanding.

As used herein, unless stated otherwise, the term "coating" is to be given its broadest possible meaning, and would include among other things, the act of applying a layer to a substrate, any material that is applied as a layer, film, or covering (partial or total) to a surface of a substrate, and includes inks, paints, and adhesives, powder coatings, foam coatings, liquid coatings. The term "coating" includes the layer, film, or thin covering (partial or total) and any layer like volumetric structure that is formed on a surface, a surface of a substrate, a substrate or is formed for later application to a substrate or surface. The substrates can essentially be any object, shape, material, apparatus, structure, device, etc., and can have many different forms and shapes.

As used herein, unless stated otherwise, the term "sparkle" is to be given its broadest possible meaning, and would include among other things, multi angle reflections simultaneously imparted from the surface facets.

As used herein, unless stated otherwise, room temperature is 25° C. And, standard ambient temperature and pressure is 25° C. and 1 atmosphere. Unless expressly stated otherwise all tests, test results, physical properties, and values that are temperature dependent, pressure dependent, or both, are provided at standard ambient temperature and pressure, this would include viscosities.

Generally, the term "about" as used herein unless specified otherwise is meant to encompass a variance or range of ±10%, the experimental or instrument error associated with obtaining the stated value, and preferably the larger of these.

As used herein, unless specified otherwise the terms %, weight % and mass % are used interchangeably and refer to the weight of a first component as a percentage of the weight of the total, e.g., formulation, mixture, material or product. As used herein, unless specified otherwise "volume %" and "% volume" and similar such terms refer to the volume of a first component as a percentage of the volume of the total, e.g., formulation, material or product.

This Background of the Invention section is intended to introduce various aspects of the art, which may be associated with embodiments of the present inventions. Thus the forgoing discussion in this section provides a framework for better understanding the present inventions, and is not to be viewed as an admission of prior art.

SUMMARY

Accordingly, there has been a long-standing and increasing need for new liquids and liquid compositions to form coatings, as well as the coatings themselves, that have reduced or minimal harmful or problematic materials, such as, e.g., VOCs, HAPs, TAPs. Similarly, there has been a long-standing and increasing need for and methods of making such compositions and coatings, as well as, using and applying such compositions and coatings. In particular, there has been a long-standing, unfulfilled and growing need for high temperature coatings that have high temperature stability, while having reduced, minimal or no problematic materials, such as, e.g., VOCs, HAPs, TAPs. The present invention, among other things, solves these needs by providing the materials, compositions, and methods taught herein.

There is provided a liquid composition for forming high temperature crack resistant coatings, the liquid composition having: methyl hydrogen fluid; a polysilocarb having vinyl groups; a filler; a wetting agent for the filler; and, a catalysis; wherein the composition is capable of forming a coating on a substrate, whereby the coating will not have visible cracks under 25× magnification when heated to 300° C.

Further, there are provided these liquids, compositions and methods having one or more of the following features: wherein the composition is essentially VOC free; wherein the composition is VOC free; wherein the composition is essentially HAP free; wherein the composition is HAP free; wherein the composition is essentially TAP free; wherein the composition is TAP free; having at least about 50% by volume filler; having at least about 30% by volume filler; having at least about 20% by volume filler; wherein the liquid composition is at least about 90 percent solids; wherein the liquid composition is at least about 95 percent solids; wherein the liquid composition is at least about 99 percent solids; wherein the liquid composition is 100 percent solids; whereby the coating will not have visible cracks under 25× magnification when heated to 400° C.; whereby the coating will not have visible cracks under 40× magnification when heated to 400° C.; whereby the coating will not have visible cracks under 75× magnification when heated to 400° C.; whereby the coating will not have visible cracks under 25× magnification when heated to 500° C.; whereby the coating will not have visible cracks under 40× magnification when heated to 500° C.; and, whereby the coating will not have visible cracks under 75× magnification when heated to 500° C. (the absence of cracks in these heating properties are for example when the coating is heated to the stated temperature for less than 10 minutes ("min"), for less than 30 minutes and for less than 1 hour ("hr").

Yet further there is provided a liquid composition for forming high temperature crack resistant coatings, the liquid composition having: methyl hydrogen fluid; a polysilocarb having vinyl groups; at least about 40% by volume of a filler; wherein the coating is at least about 95 percent solids; and, the liquid composition defining a viscosity profile of from about 4,000 to 6000 cps at 10 rpm, about 2000 to about 5000 at 20 rpm, about 2000 to about 5000 at 50 rpm, and about 1,500 to about 4000 at 100 rpm.

Moreover, there are provided these liquids, compositions and methods having one or more of the following features: wherein the liquid composition is about 98 percent solids; wherein the composition is capable of forming a coating on a substrate, whereby the coating will not have visible cracks under 25× magnification when heated to 300° C.; whereby the coating will not have visible cracks under 25× magnification when heated to 300° C.; whereby the coating will not have visible cracks under 40× magnification when heated to 300° C.; whereby the coating will not have visible cracks under 75× magnification when heated to 300° C.; and wherein the polysilocarb having vinyl groups is selected from the group consisting of a polysilocarb having the formula

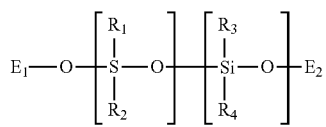

wherein $E_1$ and $E_2$ are selected from the group consisting of trimethyl silicon (—Si(CH$_3$)$_3$), dimethyl silicon hydroxy (—Si(CH$_3$)$_2$OH), dimethyl silicon hydride (—Si(CH$_3$)$_2$H), dimethyl vinyl silicon (—Si(CH$_3$)$_2$(CH=CH$_2$)), (—Si (CH$_3$)$_2$(C$_6$H$_5$)) and dimethyl alkoxy silicon (—Si(CH$_3$)$_2$ (OR); wherein R $R_1$, $R_2$, $R_3$, and $R_4$ are selected from the group consisting of hydride (—H), methyl (Me)(—C), ethyl (—C—C), vinyl (—C=C), alkyl (—R)(C$_n$H$_{2n+1}$), allyl (—C—C=C), aryl ('R), phenyl (Ph)(—C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methyl, phenyl-ethyl (—C—C(—C)(—C$_6$H$_5$); and at least one of $R_1$, $R_2$, $R_3$ or $R_4$ is a vinyl.

Additionally, there are provided these liquids, compositions and methods having one or more of the following features: wherein the polysilocarb having vinyl groups is a dimethyl polysiloxane; wherein the polysilocarb having vinyl groups is a vinyl methyl polysiloxane; having a filler wetting agent; wherein the filler wetting agent has an octyl triethoxysilane having the chemical formula of C$_{14}$H$_{32}$O$_3$Si; and, wherein the filler wetting agent has an ethyl trieoxysilane having the chemical formula of C$_8$H$_{20}$O$_3$Si.

Still further there is provided a liquid composition for forming high temperature crack resistant coatings, the liquid composition having: a polysilocarb precursor; and, at least about 10% filler; wherein the liquid composition is at least about 95 percent solids; and, wherein the composition is capable of forming a coating on a substrate, whereby the coating will not have visible cracks under 25× magnification when heated to 300° C.

Yet still further, there are provided these liquids, compositions and methods having one or more of the following features: wherein the liquid composition defines a viscosity profile of from about 4,000 to 6000 cps at 10 rpm, about 2000 to about 5000 cps at 20 rpm, about 2000 to about 5000 cps at 50 rpm, and about 1,500 to about 4000 cps at 100 rpm.

Additionally, there are provided these liquids, compositions and methods having one or more of the following features: wherein the polysilocarb precursor is selected from the group consisting of a polysilocarb having the formula

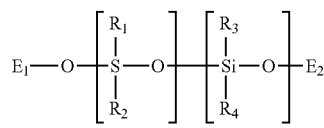

wherein $E_1$ and $E_2$ are selected from the group consisting of trimethyl silicon (—Si(CH$_3$)$_3$), dimethyl silicon hydroxy (—Si(CH$_3$)$_2$OH), dimethyl silicon hydride (—Si(CH$_3$)$_2$H), dimethyl vinyl silicon (—Si(CH$_3$)$_2$(CH=CH$_2$)), (—Si (CH$_3$)$_2$(C$_6$H$_5$)) and dimethyl alkoxy silicon (—Si(CH$_3$)$_2$ (OR); wherein R $R_1$, $R_2$, $R_3$, and $R_4$ are selected from the group consisting of hydride (—H), methyl (Me)(—C), ethyl (—C—C), vinyl (—C=C), alkyl (—R)(C$_n$H$_{2n+1}$), allyl (—C—C=C), aryl ('R), phenyl (Ph)(—C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methyl,phenyl-ethyl (—C—C(—C)(—C$_6$H$_5$)

Yet additionally, there is provided a liquid composition for forming high temperature crack resistant coatings, the liquid composition having: a polysilocarb precursor; and, at least about 10% filler; wherein the liquid composition is at least about 95 percent solids; and, wherein the liquid composition defining a viscosity profile of from about 4,000 to 6000 cps at 10 rpm, about 2000 to about 5000 cps at 20 rpm, about 2000 to about 5000 cps at 50 rpm, and about 1,500 to about 4000 cps at 100 rpm.

Additionally, there are provided these liquids, compositions and methods having one or more of the following features: having at least about 25% filler; and having at least about 40% filler.

Still further there is provided a liquid composition for forming high temperature crack resistant coatings, the liquid composition having: a polysilocarb precursor formulation; a filler; and wherein the liquid composition is at least 98 percent solids.

Additionally, there are provided these liquids, compositions and methods having one or more of the following features: wherein the composition is capable of forming a coating on a substrate, whereby the coating withstands at least 1,000 hours of continuous exposure to a neutral salt spray at 40° C. without degradation; wherein the composition is capable of forming a coating on a substrate, whereby the coating can withstand a temperature up to at least 1,200° F. with a DE of less than 1.5 color difference; wherein the composition is capable of forming a coating on a substrate, whereby the coating has a pencil hardness of at least 9 h; wherein the composition is capable of forming a coating on a substrate, whereby the coating has a pencil hardness of at least 6 h; wherein the composition is capable of forming a coating on a substrate, whereby the coating has a pencil hardness of form about 9 h to bout 6 h; wherein the composition is capable of forming a coating on a substrate, whereby the coating has a scratch resistance of at least about F; wherein the composition is capable of forming a coating on a substrate, whereby the coating withstands at least 1,000 hours of continuous exposure to a neutral salt spray at 40° C. without degradation; wherein the composition is capable of forming a coating on a substrate, whereby the coating can withstand a temperature up to at least 1,200° F. with a DE of less than 1.5 color difference; wherein the composition is capable of forming a coating on a substrate, whereby the coating withstands at least 1,000 hours of continuous exposure to a neutral salt spray at 40° C. without degradation; and, wherein the composition is capable of forming a coating on a substrate, whereby the coating can withstand a temperature up to at least 1,200° F. with a DE of less than 1.5 color difference.

Moreover, there are provided these liquids, compositions and methods having one or more of the following features: wherein the filler is selected from the group consisting of mullite, pyrophyllite, sillimanite, wollastonite, calcium carbonate, mica, diatomite, talc, titanium dioxide, and inorganic pigments.

Additionally, there are provided these liquids, compositions and methods having one or more of the following features: wherein the filler is selected from the group consisting of borates, boronic acid, chromates, mica, glass flake, talc, micaceous iron oxide, boron nitride, aluminum flake, corrosion inhibitors, zinc dust, and zinc silicates.

DESCRIPTION OF THE PREFERRED EMBODIMENTS

Figure 1:
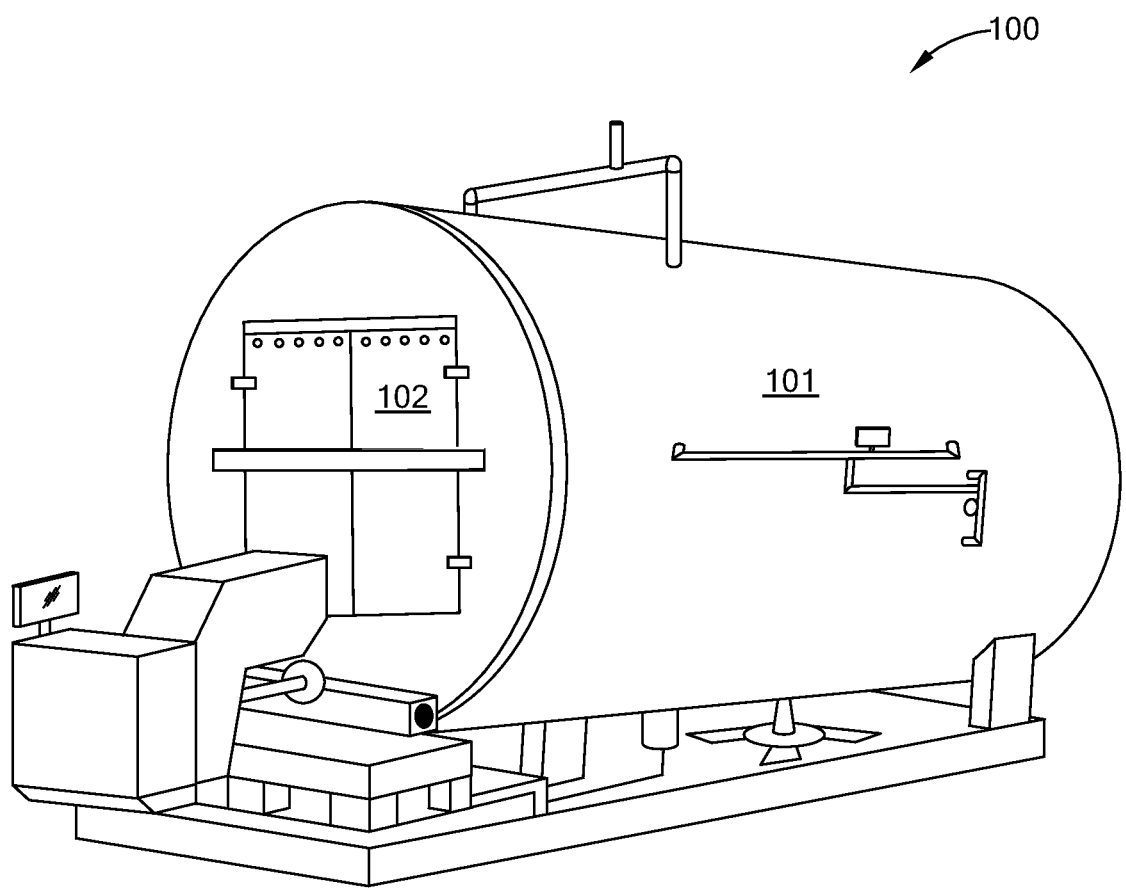
FIG. 1 is a perspective view of an embodiment of a furnace unit with high temperature doors, both having high temperature coatings utilizing the polysilocarb binder in accordance with the present inventions.
Figure 2:
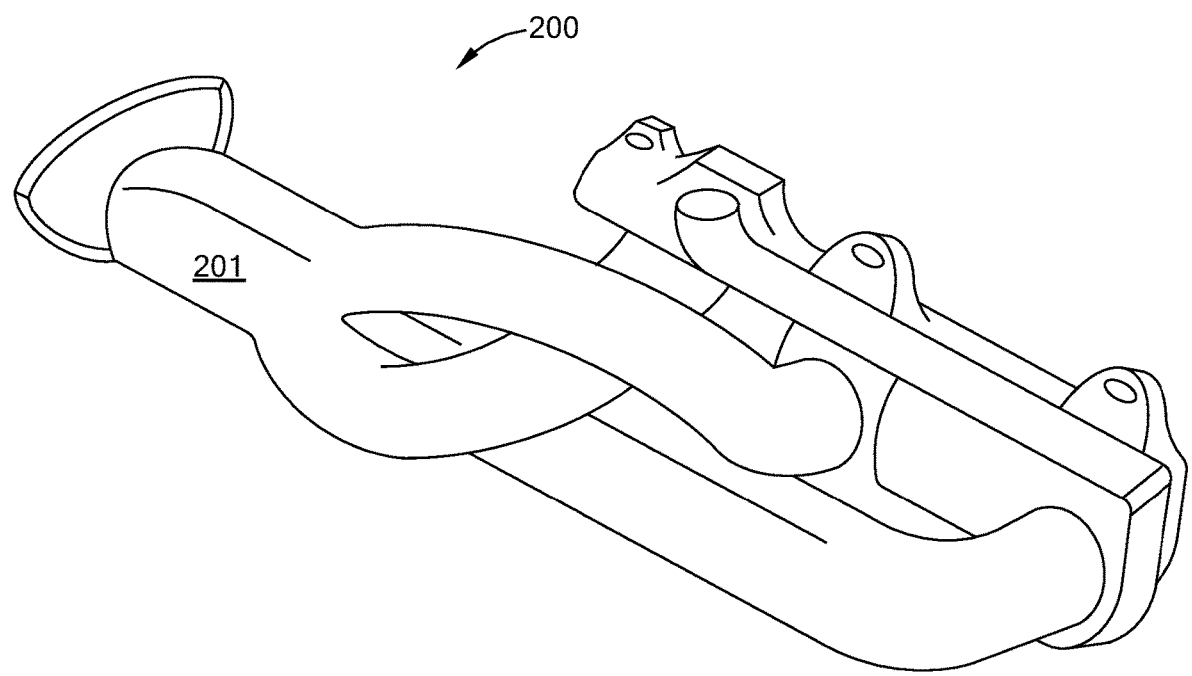
FIG. 2 is a perspective view of an embodiment of an exhaust manifold having a high temperature coating utilizing the polysilocarb binder in accordance with the present inventions.
Figure 3:
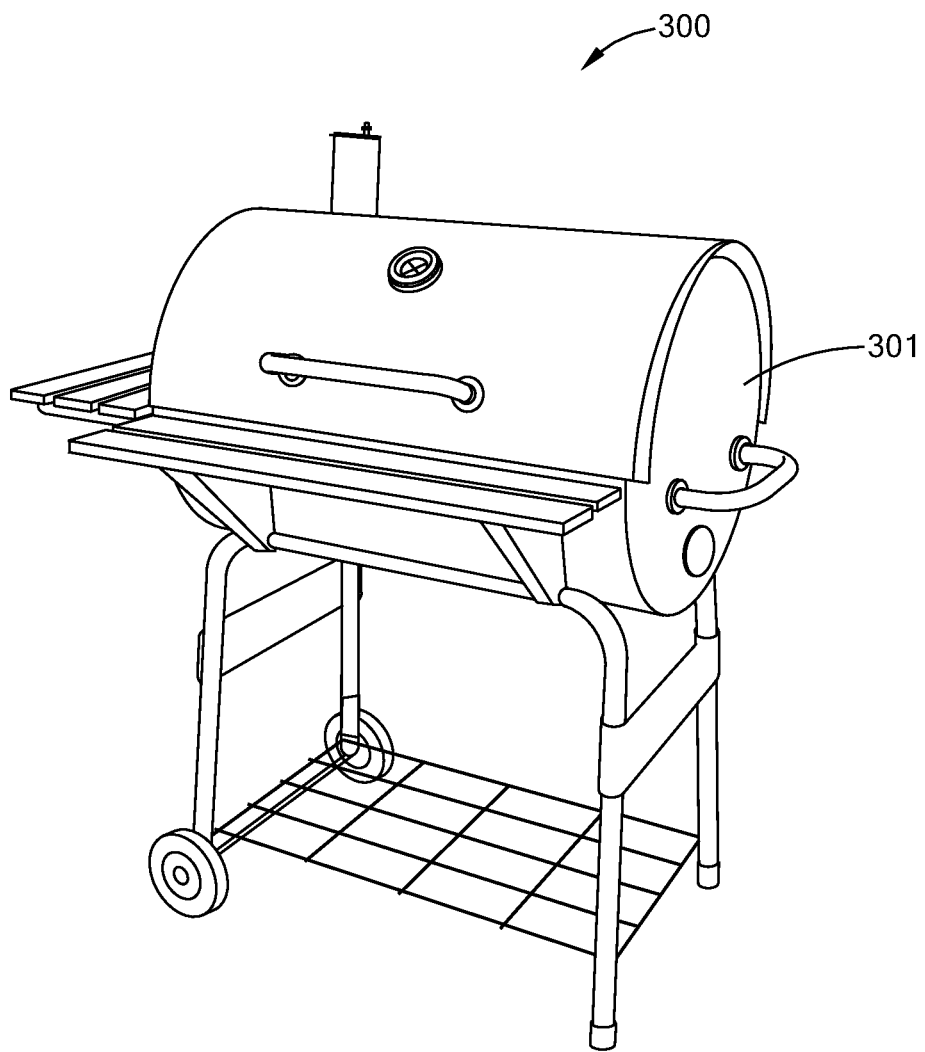
FIG. 3 is a perspective view of an embodiment of a BBQ grill having a high temperature coating utilizing the polysilocarb binder in accordance with the present inventions.

In general, the present inventions relate to unique and novel silicon (Si) based materials that are easy to manufacture, handle and have surprising and unexpected properties and applications. These silicon based materials have applications and utilizations as a liquid material, a cured material, e.g., a plastic, a preceramic, and a pyrolized material, e.g., a ceramic. In particular, embodiments of these Si based compositions have applications as coatings, both neat and filled, and further such coatings have applications as high temperature coatings. These embodiments would include polymer derived ceramic ("PDC") materials and coatings using, based on, or constituting PDCs. Embodiments the PDC based coatings of the present inventions, and in particular high temperature embodiments, have good, and excellent elasticity properties, e.g., they can deform with their substrate without cracking or peeling off, they are hard and very hard, and they are abrasive resistant, among other features and properties.

Embodiments of these high temperature coatings preferably are "polysilocarb" materials, e.g., material containing silicon (Si), oxygen (O) and carbon (C), and embodiments of such materials that have been cured, and embodiments of such materials that have been pyrolized. Polysilocarb materials may also contain other elements. Polysilocarb materials are made from one or more polysilocarb precursor formulation or precursor formulation. The polysilocarb precursor formulation contains one or more functionalized silicon polymers, or monomers, non-silicon based cross linkers, as well as, potentially other ingredients, such as for example, inhibitors, catalysts, fillers, dopants, modifiers, initiators, reinforcers, fibers, particles, colorants, pigments, dies, polymer derived ceramics ("PDC"), ceramics, metals, metal complexes, and combinations and variations of these and other materials and additives. Silicon oxycarbide materials, SiOC compositions, and similar such terms, unless specifically stated otherwise, refer to polysilocarb materials, and would include liquid materials, solid uncured materials, cured materials, and ceramic materials.

It being further understood that in applications as high temperature coatings, in use or during curing in the presence of Oxygen, the coating may be heated to a temperature where the carbon is removed from the formulation, e.g., 300° C., at which point the polysilocarb coating becomes, is essential, and in preferred cases entirely silicon and oxygen, e.g., having an —Si—O—Si-back bone, cross-linked, and both structure. Thus, in an embodiment a polysilocarb coating is applied to a substrate and during use in a high temperature application the polysilocarb coating is transitioned while on the substrate into a polysiloxane film, and provides thermal and other protections to the substrate. Thus, in an embodiment there is provided a polysilocarb containing coating that is capable of being transition to a silica, a siloxane, and polysiloxane film during intended high temperature use of the coated substrate. Thus, in embodiments after high temperature exposure in air the coating can consist of silica embedded with fillers and pigment, typically a black pigment.

Examples of PDCs, PDC formulations and starting materials, that can be used in embodiments of the present coatings are found in U.S. patent application Ser. Nos. 14/212,986, 14/268,150, 14/324,056, 14/514,257, 61/946,598, and 62/055,397, US Patent Publication No 2008/0095942, 2008/0093185, 2007/0292690, 2006/0230476, 2006/0069176, 2006/0004169, and 2005/0276961, and U.S. Pat. Nos. 9,499,677, 9,481,781, 4,657,991, 5,153,295, 7,087,656, 7,714,092 and 8,119,057, 8,742,008 and the entire disclosures of each of which are incorporated herein by reference.

By high temperature coatings, it is meet embodiments of coatings that have the ability to withstand temperatures in the range of about 200° C. to about 1,700° C., in the range of about 300° C. to about 1,500° C., in the range of about 200° C. to about 1,000° C., in the range of about 300° C. to about 1,500° C., in the range of about 300° C. to about 1,200° C., in excess of 204° C., in excess of 260° C., in excess of 426° C., in excess of 538° C., in excess of 650° C., in excess of 816° C., in excess of 954° C., in excess of 1,093° C., in excess of 1,649° C., and greater. Thus, preferred embodiments of the high temperature SiOC coatings can be held at these temperatures in the range of about 30 min to 2 days, in the range of about 30 min to 1 day, in the range of about 1 hr to about 1 day, in the range of 1 hr to about 4 hr, for more than 30 min., more than 1 hr., more than 2 hrs., more than 4 hrs., more than 1 day, and more than a week, without showing cracking, peeling, or discoloration, or diminution of performance.

Embodiments of these coatings, including the high temperature SiOC coatings, can be in the range of about 1 mil thick to about 400 mils, in the range of about 1 mil thick to about 50 mils, in the range of about 10 mils thick to about 300 mils, from about 1 mil thick and greater, (1 mil is about 0.0254 mm), about 10 mils thick and greater, about 100 mils thick and greater, from about 0.01 mils to about 400 mils, and greater and thinner thickness. The coating can be a single layer, having any of these thicknesses, or can be one, two, three, tens, or more layers. The layers can be the same or different thickness. The layers can be the same of different SiOC formulation, or can include non-SiOC formulations.

The elastic properties of the SiOC coatings, as cured, provides the ability for excellent single and multi-layer adhesion to surfaces and between layers during heating and cooling cycles of the substrate, e.g., adhesion to the substrate, as well as, layer to layer adhesion during thermal expansion and contraction. The elastic properties of the SiOC further provides the ability to have thicker single layers that was obtainable by some prior coats.

In general the ability of a coating to expand and contract similarly to the substrate can be an important features in applications, and in some application is a preferred and most preferred property. This property helps to keep the coating on the surface. Additionally, it is theorized that the adhesion of the surface in embodiments can come from the silane in the formulation. It is theorized that the silane in embodiments of the formulations, has an affinity to the metal oxide on the surface of a metal substrate, on one end of the silane and an affinity to the silicone based resins on the other end. Thus, the one end of the silane is attached to the surface of the metal substrate and the other to the coating's silanes. In embodiments, the blend of silanes, that is preselected or predetermined, to match embodiments of the present polysilocarb resins, can enhance, and in embodiments be important, to the success of the binder as a whole.

Embodiments of these coatings, including the high temperature SiOC coatings, are crack resistant. Thus, they do not crack when exposed to high temperature, and further do not crack when the substrate is subject to deformation, e.g., it is bent or vibrated. Further the avoid cracking under acid, UV or harsh environmental conditions. For example SiOC binders that are mixed with up to 50% pigment by volume concentration of filler materials, such as clay, talc, wollastantie, glass flake or mica, as well as other additives, provide SiOC coatings that can be highly crack resistant. As used herein in, unless stated otherwise, an SiOC coating includes any coatings that have, or include, an SiOC binder, base, or resin as part of their composition or formulation.

Embodiments of these coatings, including the high temperature SiOC coatings, have good and excellent adhesion properties to many substrates. These substrates will include for example, metals, ceramics, plastics, refractory materials, wood, composites (e.g., carbon fiber composites, glass fiber composites, ceramic-matrix composites, metal matrix composites, etc.), and further include stainless steel, mild steel, cast iron, aluminum, titanium, Inconel, mnemonic, copper, brass, fiber glass, carbon composites, and carbon fiber. For metal substrate the SiOC coatings will readily adhere to metals substrates. For the other non-metal substrates, the SiOC coatings can be further modified, or have specific adhesion promoters added to them so that the can adhere to these non-metal substrates.

Embodiments of these coatings including the high temperature SiOC coatings can find applications on articles such as valves, pipes, valve seats, tank linings, cooking equipment (e.g., BBQs, or pots and pans), exhaust systems, engine parts, automotive parts, flange surfaces, slip joints, bolt holes, breaks, motors, high temperature parts, aviation components, rocket components, turbine components, steam generation components, surfaces used in manufacturing caustic, corrosive and acidic chemicals, space vehicle components, wind turbine components and blades, marine components (e.g., ships), building materials, shipping containers, and fireplaces, ovens, furnaces and kilns.

Embodiments of these coatings, including the high temperature SiOC coatings, have thermal properties that allow for rapid temperature shock without cracking and have enough flexibility to not crack when the component vibrates or twists due to natural causes.

Embodiments of these coatings, including the high temperature SiOC coatings, are oxidation resistant, and for the high temperature coating embodiments, will have lower or less oxidation than non-SiOC based coatings, and preferably will not noticeably (e.g., as preserved by the eye, through a graying color change) oxidize at these temperatures, thickness and times set forth in this specification. In a preferred embodiment an SiOC coating resists color deterioration to a delta E of less than 1.5 after 1,000 hours of exposure at 1200° F. of a (new) film exposed for only 20 hours to 650° C. using the testing procedures of ASTM D4587, the entire disclosure of which is incorporated herein by reference.

Embodiments of these coatings, including the high temperature SiOC coatings, can be solvent free, or can be solvent based, with the solvents preferably including water, and solvents classified or listed as HAP free, TAP free and both, and can have 60 percent solids or more, 90 percent solids or more, 95 percent solids or more, 99 percent solids or more, and preferably 100 percent solids. As used herein, unless expressly stated otherwise, the term "percent solids" refers to the final yield content of the liquid coating formulation to the solid, e.g., dried/cured, coating. Thus, for example, 100 percent solids solids means no solvent or component is lost during cure, so everything that is put down, stays down on the coated substrate during and after curing. 100 percent solids is the preferred embodiment for low VOC's, HAP's, TAP's in the practice. In other words the denominator in a percentage solvents calculation is—the mass of formulated component input on the substrate,—and the numerator is the—mass of post-cured coating output remaining on the same substrate. The term cured yield % can also be used to describe percent solids, with a cured yield of 100% being equivalent to 100 percent solids.

Embodiments of these coatings, including the high temperature SiOC coatings, have less than about 10%, less than about 5%, less than about 2%, less than about 1%, and less than about 0.01% VOCs (Volatile Organic Compounds); and can be fully VOC compliant, under any governmental standard, industrial guideline, or regulatory requirement relating to VOCs, including 40 C.F.R. § 51 et. seq. VOCs would include any compound of carbon, excluding carbon monoxide, carbon dioxide, carbonic acid, metallic carbides or carbonates, and ammonium carbonate, which participates in atmospheric photochemical reactions. Examples of VOCs, would include among other things, Acetone, Benzene, Ethylene glycol, Formaldehyde, Methylene chloride, Perchloroethylene, Toluene, Xylene and 1,3-butadiene Embodiments of these coatings, including the high temperature SiOC coatings, have less than about 10%, less than about 5%, less than about 2%, less than about 1%, and less than about 0.01% HAPs (Hazardous Air Pollutants); and can be fully HAP complainant, under any governmental standard, industrial guideline, or regulatory requirement relating to HAPs.

HAPs can include among other things, the substances listed in the following Table:

| CAS Number | Chemical Name |
| --- | --- |
| 75070 | Acetaldehyde |
| 60355 | Acetamide |
| 75058 | Acetonitrile |
| 98862 | Acetophenone |
| 53963 | 2-Acetylaminofluorene |
| 107028 | Acrolein |
| 79061 | Acrylamide |
| 79107 | Acrylic acid |
| 107131 | Acrylonitrile |
| 107051 | Allyl chloride |

| CAS Number | Chemical Name |
|---|---|
| 92671 | 4-Aminobiphenyl |
| 62533 | Aniline |
| 90040 | o-Anisidine |
| 1332214 | Asbestos |
| 71432 | Benzene (including benzene from gasoline) |
| 92875 | Benzidine |
| 98077 | Benzotrichloride |
| 100447 | Benzyl chloride |
| 92524 | Biphenyl |
| 117817 | Bis(2-ethylhexyl)phthalate (DEHP) |
| 542881 | Bis(chloromethyl)ether |
| 75252 | Bromoform |
| 106990 | 1,3-Butadiene |
| 156627 | Calcium cyanamide |
| 105602 | Caprolactam |
| 133062 | Captan |
| 63252 | Carbaryl |
| 75150 | Carbon disulfide |
| 56235 | Carbon tetrachloride |
| 463581 | Carbonyl sulfide |
| 120809 | Catechol |
| 133904 | Chloramben |
| 57749 | Chlordane |
| 7782505 | Chlorine |
| 79118 | Chloroacetic acid |
| 532274 | 2-Chloroacetophenone |
| 108907 | Chlorobenzene |
| 510156 | Chlorobenzilate |
| 67663 | Chloroform |
| 107302 | Chloromethyl methyl ether |
| 126998 | Chloroprene |
| 1319773 | Cresols/Cresylic acid (isomers and mixture) |
| 95487 | o-Cresol |
| 108394 | m-Cresol |
| 106445 | p-Cresol |
| 98828 | Cumene |
| 94757 | 2,4-D, salts and esters |
| 3547044 | DDE |
| 334883 | Diazomethane |
| 132649 | Dibenzofurans |
| 96128 | 1,2-Dibromo-3-chloropropane |
| 84742 | Dibutylphthalate |
| 106467 | 1,4-Dichlorobenzene(p) |
| 91941 | 3,3-Dichlorobenzidene |
| 111444 | Dichloroethyl ether (Bis(2-chloroethyl)ether) |
| 542756 | 1,3-Dichloropropene |
| 62737 | Dichlorvos |
| 111422 | Diethanolamine |
| 121697 | N,N-Diethyl aniline (N,N-Dimethylaniline) |
| 64675 | Diethyl sulfate |
| 119904 | 3,3-Dimethoxybenzidine |
| 60117 | Dimethyl aminoazobenzene |
| 119937 | 3,3'-Dimethyl benzidine |
| 79447 | Dimethyl carbamoyl chloride |
| 68122 | Dimethyl formamide |
| 57147 | 1,1-Dimethyl hydrazine |
| 131113 | Dimethyl phthalate |
| 77781 | Dimethyl sulfate |
| 534521 | 4,6-Dinitro-o-cresol, and salts |
| 51285 | 2,4-Dinitrophenol |
| 121142 | 2,4-Dinitrotoluene |
| 123911 | 1,4-Dioxane (1,4-Diethyleneoxide) |
| 122667 | 1,2-Diphenylhydrazine |
| 106898 | Epichlorohydrin (l-Chloro-2,3-epoxypropane) |
| 106887 | 1,2-Epoxybutane |
| 140885 | Ethyl acrylate |
| 100414 | Ethyl benzene |
| 51796 | Ethyl carbamate (Urethane) |
| 75003 | Ethyl chloride (Chloroethane) |
| 106934 | Ethylene dibromide (Dibromoethane) |
| 107062 | Ethylene dichloride (1,2-Dichloroethane) |
| 107211 | Ethylene glycol |
| 151564 | Ethylene imine (Aziridine) |
| 75218 | Ethylene oxide |
| 96457 | Ethylene thiourea |
| 75343 | Ethylidene dichloride (1,1-Dichloroethane) |
| 50000 | Formaldehyde |
| 76448 | Heptachlor |
| 118741 | Hexachlorobenzene |
| 87683 | Hexachlorobutadiene |
| 77474 | Hexachlorocyclopentadiene |
| 67721 | Hexachloroethane |
| 822060 | Hexamethylene-1,6-diisocyanate |
| 680319 | Hexamethylphosphoramide |
| 110543 | Hexane |
| 302012 | Hydrazine |
| 7647010 | Hydrochloric acid |
| 7664393 | Hydrogen fluoride (Hydrofluoric acid) |
| 7783064 | Hydrogen sulfide |
| 123319 | Hydroquinone |
| 78591 | Isophorone |
| 58899 | Lindane (all isomers) |
| 108316 | Maleic anhydride |
| 67561 | Methanol |
| 72435 | Methoxychlor |
| 74839 | Methyl bromide (Bromomethane) |
| 74873 | Methyl chloride (Chloromethane) |
| 71556 | Methyl chloroform (1,1,1-Trichloroethane) |
| 78933 | Methyl ethyl ketone (2-Butanone) |
| 60344 | Methyl hydrazine |
| 74884 | Methyl iodide (Iodomethane) |
| 108101 | Methyl isobutyl ketone (Hexone) |
| 624839 | Methyl isocyanate |
| 80626 | Methyl methacrylate |
| 1634044 | Methyl tert butyl ether |
| 101144 | 4,4-Methylene bis(2-chloroaniline) |
| 75092 | Methylene chloride (Dichloromethane) |
| 101688 | Methylene diphenyl diisocyanate (MDI) |
| 101779 | 4,4'--Methylenedianiline |
| 91203 | Naphthalene |
| 98953 | Nitrobenzene |
| 92933 | 4-Nitrobiphenyl |
| 100027 | 4-Nitrophenol |
| 79469 | 2-Nitropropane |
| 684935 | N-Nitroso-N-methylurea |
| 62759 | N-Nitrosodimethylamine |
| 59892 | N-Nitrosomorpholine |
| 56382 | Parathion |
| 82688 | Pentachloronitrobenzene (Quintobenzene) |
| 87865 | Pentachlorophenol |
| 108952 | Phenol |
| 106503 | p-Phenylenediamine |
| 75445 | Phosgene |
| 7803512 | Phosphine |
| 7723140 | Phosphorus |
| 85449 | Phthalic anhydride |
| 1336363 | Polychlorinated biphenyls (Aroclors) |
| 1120714 | 1,3-Propane sultone |
| 57578 | beta-Propiolactone |
| 123386 | Propionaldehyde |
| 114261 | Propoxur (Baygon) |
| 78875 | Propylene dichloride (1,2-Dichloropropane) |
| 75569 | Propylene oxide |
| 75558 | 1,2-Propylenimine (2-Methyl aziridine) |
| 91225 | Quinoline |
| 106514 | Quinone |
| 100425 | Styrene |
| 96093 | Styrene oxide |
| 1746016 | 2,3,7,8-Tetrachloradibenzo-p-dioxin |
| 79345 | 1,1,2,2-Tetrachloroethane |
| 127184 | Tetrachloroethylene (Perchloroethylene) |
| 7550450 | Titanium tetrachloride |
| 108883 | Toluene |
| 95807 | 2,4-Toluene diamine |
| 584849 | 2,4-Toluene diisocyanate |
| 95534 | o-Toluidine |
| 8001352 | Toxaphene (chlorinated camphene) |
| 120821 | 1,2,4-Trichlorobenzene |
| 79005 | 1,1,2-Trichloroethane |
| 79016 | Trichloroethylene |
| 95954 | 2,4,5-Trichlorophenol |
| 88062 | 2,4,6-Trichlorophenol |
| 121448 | Triethylamine |
| 1582098 | Trifluralin |

-continued

| CAS Number | Chemical Name |
|---|---|
| 540841 | 2,2,4-Trimethylpentane |
| 108054 | Vinyl acetate |
| 593602 | Vinyl bromide |
| 75014 | Vinyl chloride |
| 75354 | Vinylidene chloride (1,1-Dichloroethylene) |
| 1330207 | Xylenes (isomers and mixture) |
| 95476 | o-Xylenes |
| 108383 | m-Xylenes |
| 106423 | p-Xylenes |

Embodiments of these coatings, including the high temperature SiOC coatings, have less than about 10%, less than about 5%, less than about 2%, less than about 1%, and less than about 0.01% TAPs (Toxic Air Pollutants); and can be fully TAP complainant, under any governmental standard, industrial guideline, or regulatory requirement relating to TAPs.

Embodiments of the high temperature SiOC coatings do not have burn offs at the temperatures, thickness, and times set forth in this specification.

Embodiments of these coatings, including the high temperature SiOC coatings, are rust inhibiting.

Embodiments of these coatings, including the high temperature SiOC coatings can meet, one, two, or more, and all of the following ASTM features, or performance criteria.

Corrosion Resistance

ASTM B117, salt fog corrosion testing—need to pass 1,000 hours to 5000 hours of continuous exposure to a Neutral Salt Spray at 40° C. by having no defect in the coating outside of the scribe.

Embodiments of the present coatings, preferably also meet more aggressive cyclic corrosion testing which is conducted by the customer in their own equipment to demonstrate corrosion resistance more closely aligned with actual end use conditions.

Heat Resistance

ASTM D2485, heat resistance test up to 1,200'F—need to have a DE of less than 1.5 color difference, no cracking when coating is heated and exposed to placing it into a bucket of room temperature water, no micro-cracking in the coating as seen under microscope to 75x.

Humidity Resistance

ASTM D4585, pass 1,000 to 5,000 hours without any film deformation.

Chemical Resistance

ASTM D1308, must not have permanent deformation when exposed to household chemicals, solvents, acids or bases.

Adhesion

Cross hatch ASTM D3359, must not have any film removed with tape pull, 4b. Pull tab ASTM D4541, must not have any film removed.

Impact Resistance

ASTM D2794, 80/20 inch pounds.

Hardness

Pencil hardness ASTM D3363, 9 h to 6 h.

ASTM D3363, Scratch resistance, F.

Mandrel Bend

ASTM D522, no coating loss at 45' rotation

Pot Life

ASTM D1200, 3 hours

The entire disclosure of the forgoing ASTM standards is incorporated herein by reference.

Further, and generally, the present inventions relate to coatings, paint bases, and film forming materials that meet one, two, three, or more, and all of the above ASTM standards, and are made from or include the precursors to preceramic materials, inorganic polymers, inorganic semi-organic polymers, organosilicon materials and polymers, mixtures of such precursors, preceramic materials, cured preceramic materials, cured mixtures of precursors, cured inorganic polymers, cured inorganic semi-organic polymers, ceramic materials, and methods and processes for making these precursors, inorganic polymers, inorganic semi-organic polymers, mixtures, preceramic materials, cured materials and ceramic materials. In particular, and preferably, embodiments of the coatings, paint bases, and film forming materials of the present inventions include polymer derived ceramic materials, polymer derived cured preceramic materials, precursors to polymer derived preceramic and ceramic materials, mixtures of precursors to polymer derived preceramic and ceramic materials, and methods and processes relating to these materials.

Generally, the polysilocarb precursor formulation is cured to form a solid or semi-sold coating, e.g., layer, or film, on a substrate. The polysilocarb precursor formulation may be processed through an initial cure, to provide a partially cured material, which may also be referred to, for example, as a green material, or green cure (not implying anything about the material's color). The green material may then be further cured. Thus, one or more curing steps may be used. The material may be "end cured," i.e., being cured to that point at which the coating has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, or the leveling off of the decrease in reactive groups over time). Thus, a layer of the material may be cured to varying degrees, for example in a multi-layer embodiment, the layers can be green cured to promote layer adhesion, then finally cured to a hard cure. In some situations the end cure and the hard cure may be the same. Each layer in a multi-layer coating can be cured to the same degree of cure, to different degrees of cure, subject to one, two, three or more curing steps, and combinations and variations of these.

The curing may be done at standard ambient temperature and pressure ("SATP", 1 atmosphere, 25° C.), at temperatures above or below that temperature, at pressures above or below that pressure, and over varying time periods (both continuous and cycled, e.g., heating followed by cooling and reheating), from less than a minute, to minutes, to hours, to days (or potentially longer), and in air, in liquid, or in a preselected atmosphere, e.g., Argon (Ar) or nitrogen ($N_2$), the atmosphere can be flow, can have off gasses removed or can be sealed. Curing can be done, in multi-layer embodiments on a layer-by-layer basis, on all layers at once, and combinations and variations of these.

The the polysilocarb coating material (e.g., precursor batch, precursor, formulation, bulk liquid, etc.), can have various inhibitors, catalysts and initiator present that inhibit, regulate, or promote curing, under predetermined conditions. Thus, the polysilocarb coating material can have sufficient inhibitors present, or the absence of a catalyst, to provide the required shelf life for the material in storage. Upon application as a coating to a substrate steps can be taken to cause curing at the desired and preferably predetermined rate. Thus, by way of illustration:

(i) a two part system can be used where a catalyst is added to the polysilocarb material prior to application to the substrate, in this embodiment the catalyzed formulation as applied can preferably be cured at room temperature, or at a controlled elevated temperature, e.g., 75° C., 100° C., 150° C.

(ii) the formulation in bulk can be such (e.g., amounts of vinyls, hydrides or other reactive groups, catalyst, and inhibitors to name a few) that curing does not occur until an exotherm is reached at which point the curing carries forward to completion. In this embodiment a heat source can be applied to heat the coating and initiate the exotherm.

(iii) an initiator maybe present on the substrate that initiates or regulates the curing of the coating.

(iv) the formulation itself may be such that curing can be accomplished at a predetermined temperature without the need for a catalyst, or the addition of catalyst prior to or during the application of the formulation as a coating, e.g., a one component system.

(v) the atmosphere present during curing and in contact with the coating can promote, regulate, cause or initiate the curing.

In these curing applications, in general and typically, care is taken to not damage the underlying substrate during curing. It should further be understood that because these are thin, and very thin, layers of formulations that are being cured, many approaches to and techniques for curing that are not available to cure thicker volumetric structures can be used.

Heating sources can be light, e.g., broad spectrum while light, UV light, IR light, coherent electromagnetic radiation (e.g. lasers) convection heating, and other source of paint, ink and coating drying and curing know to the arts.

The bulk polysilocarb precursor formulation can be applied as a coating, layer or film, to a structure, part, intermediate, or end product, the polysilocarb formulation can be, for example, sprayed, flowed, thermal sprayed, painted, brushed, formed, rolled, extruded, roll coated, knife coated, or otherwise manipulated into essentially any coating, layer, and planer shape (which still has a volume, but is more akin to a coating, skin, film, or even a counter top, where the thickness is significantly smaller, if not orders of magnitude smaller, than the shapes other dimensions), and combinations and variations of these.

The polysilocarb precursor formulations can be made into non-reinforced, non-filled, composite, reinforced, and filled coatings on structures, intermediates and end products, and combinations and variations of these and other types of materials.

The precursor formulations may be used to form a "neat" material, (by "neat" material it is meant that all, and essentially all of the structure is made from the precursor material or unfilled formulation; and thus, there are no fillers or reinforcements) to be used as a part of, or as a coating. They may be used to form composite materials, e.g., reinforced coatings. They may be used to form non-reinforced coatings, which are coatings that are made of primarily, essentially, and preferably only from the precursor materials, for example a pigmented polysiloxane coating having only precursor material and a colorant would be considered non-reinforced coating.

The polysilocarb precursor formulations may be used with reinforcing materials to form composite layers or coatings. Thus, for example, the formulation may be flowed into, impregnated into, absorbed by or otherwise combined with a thin reinforcing material, such as carbon fibers, glass fiber, woven fabric, non-woven fabric, copped fibers, fibers, rope, braided structures, ceramic powders, glass powders, carbon powders, graphite powders, ceramic fibers, metal powders, carbide pellets or components, staple fibers, tow, nanostructures of the above, PDCs, any other material that meets the temperature requirements of the process and end product, and combinations and variations of these. Thus, for example, the reinforcing materials may be any of the high temperature resistant reinforcing materials currently used, or capable of being used with, existing plastics and ceramic composite materials. Additionally, because the polysilocarb precursor formulation may be formulated for a lower temperature cure (e.g., SATP) or a cure temperature of for example about 100° F. to about 400° F., the reinforcing material may be polymers, organic polymers, such as nylons, polypropylene, and polyethylene, as well as aramid fibers, such as NOMEX or KEVLAR.

The reinforcing material may also be made from, or derived from the same material as the formulation that has been formed into a fiber, cured into a solid, pyrolized into a ceramic, or it may be made from a different precursor formulation material, which has been formed into a fiber, pyrolized into a ceramic and combinations and variations of these. In addition to ceramic fibers derived from the precursor formulation materials that may be used as reinforcing material, other porous, substantially porous, and non-porous ceramic structures derived from a precursor formulation material may be used.

The presently preferred embodiments of the present coatings, and in particular the high temperature coatings, are essentially non-porous and form barriers to, and protect the substrate from, environmental conditions, such as oxidation, the environment, caustics or acids, etc. Porous coatings, including high temperature porous coatings are also contemplated. Thus, an essentially non-porous coating has less than 0.01 volume % porosity, less than 0.001% volume porosity. Further an essentially non-porous coating has an average pore size in the range from about 0.01 μm to about 0.0001 μm, in the range from about 0.01 μm to about 0.005 μm, in the range from about 0.01 μm to about 0.001 μm, of less than about 0.01 μm, less than about 0.001 μm and less than about 0.0001 μm.

The polysilocarb precursor formulation may be used to form a filled coating. A filled coating would be any coating having other solid, or semi-solid, materials added to the polysilocarb precursor formulation. The filler material may be selected to provide certain features to the cured coating, the ceramic product or both. These features may relate to or be aesthetic, tactile, thermal, density, radiation, chemical, magnetic, electric, and combinations and variations of these and other features. These features may be in addition to strength. Thus, the filler material may not affect the strength of the cured or ceramic material, it may add strength, or could even reduce strength in some situations. The filler material could impart color, magnetic capabilities, fire resistances, flame retardance, heat resistance, electrical conductivity, anti-static, optical properties (e.g., reflectivity, refractivity and iridescence), aesthetic properties (such as stone like appearance in building products), chemical resistivity, corrosion resistance, wear resistance, abrasions resistance, thermal insulation, UV stability, UV protective, and other features that may be desirable, necessary, and both, in the end product or material. Thus, filler materials could include copper lead wires, thermal conductive fillers, electrically conductive fillers, lead, optical fibers, ceramic colorants, pigments, oxides, dyes, powders, ceramic fines, PDC particles, pore-formers, carbosilanes, silanes, silazanes, silicon carbide, carbosilazanes, siloxane, powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, PDC particles, e.g., fines or beads, can be added to a polysilocarb formulation and then cured to form a filled cured plastic material, which has significant fire resistant properties as a coating or structural material.

As used herein, unless specifically provided otherwise, the terms flame retardant, fire retardant, flame resistant, fire resistant, flame protection, fire protection, flame suppression, fire suppression, and similar such terms are to be given their broadest possible meanings, and would include all burning, fire, combustion or flame related meanings that are found, described or set forth in standards, codes, certifications, regulations, and guidelines, and would include the lessening, reduction, and avoidance of fire, combustion or smoke.

The fill material may also be made from, or derived from the same material as the formulation that has been formed into a cured or pyrolized solid, or it may be made from a different precursor formulation material, which has been formed into a cured solid or semi-solid, or pyrolized solid.

The polysilocarb formulation and products derived or made from that formulation may have metals and metal complexes. Thus, metals as oxides, carbides or silicides can be introduced into precursor formulations, and thus into a silica matrix in a controlled fashion. Thus, using organometallic, metal halide (chloride, bromide, iodide), metal alkoxide and metal amide compounds of transition metals and then copolymerizing in the silica matrix, through incorporation into a precursor formulation is contemplated.

The filler material could impart, regulate or enhance, for example, electrical resistance, magnetic capabilities, band gap features, p-n junction features, p-type features, n-type features, dopants, electrical conductivity, semiconductor features, anti-static, optical properties (e.g., reflectivity, refractivity and iridescence), chemical resistivity, corrosion resistance, wear resistance, abrasions resistance, thermal insulation, UV stability, UV protective, and other features that may be desirable, necessary, and both, in the end product or material.

Thus, filler materials could include copper lead wires, thermal conductive fillers, electrically conductive fillers, lead, optical fibers, ceramic colorants, pigments, oxides, dyes, powders, ceramic fines, polymer derived ceramic particles, pore-formers, carbosilanes, silanes, silazanes, silicon carbide, carbosilazanes, siloxane, metal powders, ceramic powders, metals, metal complexes, carbon, tow, fibers, staple fibers, boron containing materials, milled fibers, glass, glass fiber, fiber glass, and nanostructures (including nanostructures of the forgoing) to name a few. For example, crushed, polymer derived ceramic particles, e.g., fines or beads, can be added to a polysilocarb formulation and then cured to form a filled cured plastic material, which has significant fire resistant properties as a coating or in a device or component of a device.

Adhesion promoters can be added to the polysilocarb coating formulations. Adhesion promoters are materials that are selected to enhance and improve the coating's wettability to the substrate surface, to promote or cause the adhesion of the costing to the substrate and both. Adhesion promoters can be specifically tailored to a particular substrate. Examples of promoters, and promoter-substrate combinations are: glycidylpropyltrimethoxysilane; aminoproplytrimethoxysilane; glycidylpropyltrimethoxysilane-carbon steel; aminoproplytrimethoxysilane; pormoters-carbon steel; octyl triethoxy silane, vinylpropyltrimethoxy silane, vinyl triethoxy silane, methyltrimethoxy silane, 3-isocyanatopropyltriethoxysilane, phenylaminopropyltrimethoxysilane, as well as, triethoxy- and trimethoxy-silanes having R groups of: vinyl, phenyl, alkyl (methyl, ethyl, propyl, octyl, etc), allyl, aminopropyl or primary or secondary amine functionality, methacrylate functionality, isocyanyl functionality, glycidylpropyl or epoxy functionality, and hydride.

Additionally, fillers and additives that can be used for bases can include for example Kaolin, mullite, pyrophyllite, kyanite, sillimanite, wollastonite, calcium carbonate, Nepheline Syenite, Silica, Barium sulphate, mica, diatomite, talc, Titanium dioxide, orthophosphates, polyphosphates, inorganic pigments including copper chromite, iron oxide, iron antimony oxide, manganese iron oxide, borates, boronic acid, chromates, leads, molybdates, phosphates, phosphites and silicates, high aspect ratio fillers and platelets such as mica, glass flake, talc, micaceous iron oxide, boron nitride, aluminum flake, corrosion inhibitors, zinc dust, zinc silicates, rheology modifiers, adhesion promoters, wetting agents, surfactants, anti-oxidants, UV absorbers, HALS, pigments, sintering aids.

The liquid polysilocarb binder precursor coating formulation can be used in formulations having antioxidants. It is theorized that the polysilocarb precursors may provide added anti-oxidation protection to these antioxidant containing formulations. Typical antioxidants include for example preventive antioxidants, peroxide decomposers, sulfides, phosphites, metal complex agents, and others.

The liquid polysilocarb binder precursor coating formulation can be used in, with, or as a component of, or as, formulations having hinder amine light stabilizers ("HALS"), which function to prevent the photo oxidative degradation of coatings. It is theorized that the polysilocarb precursors may provide added photo-oxidation protection to these HALS containing formulations.

The liquid polysilocarb binder precursor coating formulation can be used in, with, or as a component of, many types of coating or formulations, such as for example thermoplastic acrylic resins, thermosetting acrylic resins, hydroxy-functional acrylic resins, water reducible thermosetting acrylic resins, waterborne coatings (i.e., any coating with an aqueous media, e.g., latex coatings), water reducible coatings (i.e., a waterborne coating based on a resin having hydrophilic groups in most or all of its molecules), water soluble coatings (i.e., are soluble in water), latexes, acrylic latexes, vinyl ester latexes, thermosetting latexes, polyester resins, hydroxy-terminated polyester resins, amino resins, aminoplast resins, baked thermosetting coatings, melamine-formaldehyde resins (e.g., class I and class II), urea-formaldehyde resins, benzoguanamine-formaldehyde resins, glycoluril-formaldehyde resins, poly(meth)acrylamide-formaldehyde resins, polyurethane resins, two package solvent borne urethane coatings, epoxy resins, waterborne epoxy-amine systems, drying oil based resins, varnishes, alkyd resins, silicones, silicone rubber resins, and tetraethylorthosilicate (TEOS) based resins, among others.

The liquid polysilocarb binder precursor coating formulations may further be used in, with, as a part of, or combined with, high temperature coatings of siloxanes, silsesquioxanes, sol-gel coatings.

In embodiments of the above combination and uses of polysilocarb binder precursor coating formulations the combinations may be emulsions. Thus, for oil-in-water and water-in-oil emulsions the polysilocarb component would be the oil phase of the emulsion.

The liquid polysilocarb binder precursor coating formulation may be used in a mill base, and may be used with dispersants such as polymeric dispersants, A-B copolymer dispersants, hyperdispersants, superdispersants, and others may be used.

It being understood that the polysilocarb mill base can be prepared and stored for later use, shipped, or used immediately. Further the step of making a mill base may be combined with, a part of, or otherwise incorporated into the process of formulation and making the coating.

EXAMPLES

The following examples are provided to illustrate various embodiments of processes, precursors, polysilocarb formulations, coatings, films, coating formulations, prepregs, cured preforms, and ceramics of the present inventions. These examples are for illustrative purposes, and should not be viewed as, and do not otherwise limit the scope of the present inventions. The percentages used in the examples, except for "percent solids" which is defined above, are weight percents of the total formulation, preform or structure. The usage X/Y or XY indicates % of X and the % of Y in the formulation. The usage X/Y/Z or XYZ indicates the % of X, % of Y and % of Z in the formulation.

Example 1

A polysilocarb binder precursor coating formulation having a viscosity of greater than 5,000 cps, 100 percent solids, HAP free, and having 85/15 MHF/DCPD.

Example 2

A polysilocarb binder precursor coating formulation having a viscosity of less than 15,000 cps, 90 percent solids, substantially HAP free, and 82/13/4 MHF/DCPD/TV.

Example 3

A polysilocarb binder precursor coating formulation having a viscosity of greater than 2,000-20,000 cps, 70 percent solids-100 percent solids, and having 40-85% MH (and preferably MHF); 0-25% Tetravinyl; and 0-55% Diene (Diene=Dicyclopentadiene or Isoprene or Butadiene).

Example 4

A polysilocarb binder precursor coating formulation having a viscosity of greater than 2,000-20,000 cps, 70 percent solids-100 percent solids, and having a 48/48/4 MHF/DCPD/TV.

Example 5

A polysilocarb binder precursor coating formulation having a viscosity of greater than 5,000-15,000 cps, 90 percent solids-100 percent solids, and having 70/30 MH/TV.

Example 6

A polysilocarb binder precursor coating formulation having a viscosity of greater than 5,000-15,000 cps, 90 percent solids-100 percent solids, and having 70/20/10 MH/TV/VT.

Example 7

The binder precursor coating formulations of Examples 1 to 6 is made into a coating for application to a substrate by adding a catalyst (e.g., 2% "P01", which is a 2% Pt(0) tetravinylcyclotetrasiloxane complex (e.g., tetramethyltetravinylcyclotetrasiloxane) in tetravinylcyclotetrasiloxane, diluted 20× with tetravinylcyclotetrasiloxane to 0.1% of Pt(0) complex), and by adding 50% by volume of filler. The filler can be one or more of any of the fillers identified in this specification, the pigments disclosed and taught in U.S. patent application Ser. Nos. 14/634,828 and 14/634,819 the entire disclosure of each of which is incorporated herein by reference, carbon black, or any other pigment, effects pigment, additive or filler known to those of skill in the arts.

Example 8

The binder precursor coating formulations of Examples 1 to 6 is made into a coating for application to a substrate by adding a catalyst (e.g., 1% catalyst having 10 ppm platinum and 0.5% Luperox 231 peroxide), and by adding 50% by volume of filler and by adding an adhesion promoter (e.g., 2% glycidylpropyltrimethoxysilane, 2% aminoproplytrimethoxysilane or both) and by adding 50% by volume of filler. The filler can be one or more of any of the fillers identified in this specification, the pigments disclosed and taught in U.S. patent application Ser. Nos. 14/634,828 and 14/634,819 the entire disclosure of each of which is incorporated herein by reference, carbon black, or any other pigment, effects pigment, additive or filler known to those of skill in the arts.

Example 9

The binder precursor coating formulations of Examples 1 to 6 is made into a coating for application to a substrate by adding a catalyst (e.g., 1%, 2%, 3% or more, of one or more of the catalysts set forth in this specification, known to the art, or later discovered), and by adding 40% by volume of filler. The filler can be one or more of any of the fillers identified in this specification, the pigments disclosed and taught in U.S. patent application Ser. Nos. 14/634,828 and 14/634,819 the entire disclosure of each of which is incorporated herein by reference, carbon black, or any other pigment, effects pigment, additive or filler known to those of skill in the arts.

Example 10

The binder precursor coating formulations of Examples 1 to 6 is made into a coating for application to a substrate by adding a catalyst (e.g., 1%, 2%, 3% or more, of one or more of the catalysts set forth in this specification, known to the art, or later discovered), and by adding 60% by volume filler. The filler can be one or more of any of the fillers identified in this specification, the pigments disclosed and taught in U.S. patent application Ser. Nos. 14/634,828 and 14/634,819 the entire disclosure of each of which is incorporated herein by reference, carbon black, or any other pigment, effects pigment, additive or filler known to those of skill in the arts.

Example 11

The formulations of Examples 9 and 10 have 1%, 2%, 4% or more of an adhesion promoter added to them.

Example 12

The formulations of Examples 7 to 11 the filler type and volume % addition is selected so that the viscosity remains below 15,000 cps.

Example 12

The formulations of Examples 7 to 11 the filler type and volume % addition is selected so that the viscosity remains below 10,000 cps.

Example 13

The formulations of Examples 7 to 11 the filler type and volume % addition is selected, such that a solvent is added to the formulation to provide for a predetermined viscosity, e.g., below 15,000 cps, below 10,000 cps.

Example 13A

The formulations of Examples 7 to 13 to which 10-50 wt % boric acid is incorporated.

Example 13B

The formulations of Examples 7 to 13 to which 10-50 wt % triethylborate has been added.

Example 14

The coating provides protection from fire to the structural building components, such that the polysilocarb coated structural component meets or exceeds the requirements of ASTM E-119, the entire disclosure of which is incorporated herein by reference. These coatings are also UV stable, corrosion resistance and are water repellent.

Example 15

The coatings can be applied to, or utilized with, for example, assemblies of masonry units and composite assemblies of structural materials for buildings, including bearing and other walls and partitions, columns, girders, beams, slabs, and composite slab and beam assemblies for floors and roofs, as well as other assemblies and structural units that constitute permanent integral parts of a finished building.

Example 16

The coatings of Example 15 can impart or provide Standard Fire Test performance exposures of at least about ½-h, about 2-h, about 4-h and about 6-h or more.

Example 17

The polysilocarb protective coating is non-halogenated, e.g., it does not contain any halogens. Thus, the protective coating can be substantially free from halogens, i.e., the amount of halogens in any off gassing is so low as to render the level acceptable or permissible for human exposure; can be essentially free from halogens, i.e., the amount of halogens is so low as to render their presence in any off gassing undetectable by normal gas sensing devices used by those of skill in the art to test for the presence of halogens; and, can be free from halogens, i.e., the off gases contain no detectable or measurable presence of halogens. This polysilocarb protective coating is also non-toxic and will not produce toxic or dangerous gasses during exposure to fire or high temperatures. Thus, it is a non-toxic off gassing coating. Additionally, it will not produce any harmful or toxic degradation products. Essentially, upon exposure to extreme heat or flame, the polysilocarb coating goes through further curing and hardening, or a pyrolysis reaction eventually, and typically, turning the coating into a ceramic.

Example 18

The polysilocarb coating, or additive, can also impart, or enhance, the thermal barrier properties of a material. Such coated steel or concrete structures, for example, may have the fire or temperature resistance properties set out in Table I, or they more preferably may exceed those properties

TABLE I

| Time = t | Furnace-Flame Temperature (° F.) on exposed surface at time t | Temperature (° F.) on unexposed surface at time t |
| --- | --- | --- |
| 0.5 hr | 1,550 | <1,000 |
| 1 hr | 1,700 | <1,000 |
| 2 hr | 1,850 | <1,000 |
| 4 hr | 2,000 | <1,000 |
| 8 hr | 2,300 | <1,000 |

Example 19

A polysilocarb binder precursor coating formulation having a viscosity of greater than 5,000-15,000 cps, 90 percent solids-100 percent solids, and having 41% MHF and 59% TV.

Example 20

A polysilocarb binder precursor coating formulation having a viscosity of greater than 5,000-15,000 cps, 90 percent solids-100 percent solids, and having 41% MHF and 59% MVF.

Example 21

A polysilocarb binder precursor coating formulation having a viscosity of greater than 5,000-15,000 cps, 90 percent solids-100 percent solids, and having having from about 40% MHF to about 55% MHF and from about 60% MVF to about 55% MVF.

Example 22

A polysilocarb formulation is applied in liquid form to a substrate to form a coating. The coating is then cured increasing the ability of the substrate to resisting burning when subject to a fire. The formulation may be catalyzed or uncatalyzed. The coating may be one, two, three or more coats (e.g., layers) of the polysilocarb formulation. Preferably the coating cures, to a hard cure, in less than 2 days under ambient conditions. However, external heat source can be used to cure the coating. The substrates may be existing articles such as for example, the interior walls of a house or building, the wood frame of a building prior to installation of the walls, floors, roofs, decks, the exterior of a structure (e.g., house, office or barn), the ground or brush (e.g., to form a fire break), and they may be building supply materials such as dry wall, plywood and 2×4s that are coated before being used in a building.

Example 23

A polysilocarb binder precursor coating formulation having a viscosity of greater than 5,000-15,000 cps, 90 percent solids-100 percent solids, and having from about 40% MHF to about 55% MHF and from about 60% MVF to about 55% MVF.

Example 24

A polysilocarb formulation is coated onto the surface of a pipe and soft cured. The polysilocarb formulation is filled, for example, with pyrolized polysilocarb ceramic fines. This process is repeated until the desired thickness of the coating is obtained. Once the desired thickness of the coating has been obtained the soft cured layers are end cured. A coating along the exterior of the pipe can provide thermal insulation to the pipe, as well as, corrosion resistance. An internal coating to the pipe may also provide thermal insulation for the materials in the pipe, and provides corrosion resistance. The corrosion resistance provided by the cured polysilocarb internal coating can enable the replacement of more expensive stainless steel and other high priced alloys with lower priced metals.

Example 25

A polysilocarb formulation is coated on a wall material and cured. The coating provides a vapor barrier, reducing and preferably preventing, for example, odors in the wall from fire damage, from being smelled in the room.

Example 26

A polysilocarb mill bases using pigments disclosed and taught in U.S. Pat. Nos. 9,499,677, 9,481,781, the entire disclosures of each of which are incorporated herein by reference. The mill base has a polysilocarb base of Examples 1 to 13B, a thermoplastic acrylic polyol resin, a solvent Methyl amyl ketone and has a pigment loading of 1.5 to 6.0 pounds per gallon. The mill bases exhibits Newtonian flow characteristics.

Example 27

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a thermoplastic acrylic polyol resin, a solvent Methyl Amyl ketone and has a pigment loading of 1.5 to 6.0 pounds/gallon. The mill bases exhibits Newtonian flow characteristics.

Example 28

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a thermoplastic acrylic polyol resin, a solvent methyl amyl ketone and has a pigment loading of 1.5 to 6.0 pounds per gallon. The mill bases exhibits Newtonian flow characteristics.

Example 29

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a thermoplastic acrylic polyol resin, a solvent methyl amyl ketone and has a pigment loading of 1.5 to 6.0 pounds/gallon.

Example 30

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a thermoplastic acrylic emulsion, a solvent water and has a pigment loading of 1.5 to 6 pounds/gallon Example 31

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a low molecular weight Bisphenol A diglycidal ether resin, a solvent xylene, and has a pigment loading of 1.5 to 6.0 pounds/gallon Example 32

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a modified hydroxyl ethyl cellulose, surfactant, and water and has a pigment loading of 1.5 to 8.0 pounds/gallon Example 33

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a silicone resin, a solvent xylene and has a pigment loading of 1.5 to 5.0 pounds/gallon Example 34

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a mineral oil based resin, a solvent mineral spirits and has a pigment loading of 1.5 to 8 pounds/gallon.

Example 35

A polysilocarb mill bases using pigments disclosed and taught in U.S. Pat. Nos. 9,499,677, 9,481,781 the entire disclosures of each of which are incorporated herein by reference. The mill base has a polysilocarb base of Examples 1 to 13B, a mineral oil based resin, a solvent mineral spirits and has a pigment loading of 2 pounds/gallon.

Example 36

A mill base has a polysilocarb base of Examples 1 to 13B, a thermoplastic acrylic polyol resin, a solvent Methyl amyl ketone and has a pigment loading of 1.5 to 6.0 pounds per gallon. The mill bases exhibits Newtonian flow characteristics.

Example 37

A mill base has a polysilocarb base of Examples 1 to 13B, a thermoplastic acrylic polyol resin, a solvent Methyl Amyl ketone and has a pigment loading of 1.5 to 6.0 pounds/gallon. The mill bases exhibits Newtonian flow characteristics.

Example 38

A mill base has a polysilocarb base of Examples 1 to 13, a thermoplastic acrylic polyol resin, a solvent methyl amyl ketone and has a pigment loading of 1.5 to 6.0 pounds per gallon. The mill bases exhibits Newtonian flow characteristics.

Example 39

A polysilocarb mill bases using platelets disclosed and taught in U.S. Pat. Nos. 9,499,677, 9,481,781 and U.S. patent application Ser. Nos. 15/002,773, 14/634,819 and 14/634,828 the entire disclosures of each of which are incorporated herein by reference. The mill base has a polysilocarb base of Examples 1 to 13B, a modified hydroxyl ethyl cellulose, surfactant, and water and has a platelet loading of 1.5 to 8.0 pounds/gallon

Example 40

A high temperature liquid resin that when applied to a substrate forms a high temperature crack resistant coating. The resin can also service as a base or other component in a paint and more complex coating formulations having pigments and other components. The liquid resin has a polysilocarb part that has 303.2 lbs/36.49 gals/58.83 wt. % polysilocarb precursor formulation. The polysilocarb precursor formulation has 55% by weight MHF and 45% Vinyl Methyl Fluid (VMF). VMF is a copolymer having 50 mol % dimethyl polysiloxane and 50 mol % vinyl methyl polysiloxane repeat units in the siloxane backbone (although other ratios are contemplated). The polysilocarb based part also has 6.1 lbs/0.73 gals/1.18 wt % Coatosil 1770 Beta-(3,4-Epoxycyclohexyl) ethyltriethoxysilane. These components are thoroughly mixed for 20 min at 1500 to 2000 rpm. At which point the filler is added into the mixture. 97.4 lbs/4.50 gals/18.90 wt % Vinyl-Silane Treated GF=001 ECR Glass Flake and 105.7 lbs/4.50 gals/20.51 wt % Imerys C-3000 Miconized Mica. To this 3.0 lbs/0.36 gals/0.58 wt % of a catalysist were added. The catalysis is 1% Ashby Platinum Catalyst (~8.39 lbs/gal)

The resin formulation, prior to addition of the catalyst had the following viscosity profile

| Viscosities (cps) | Part A | A + B |
|---|---|---|
| 10 rpm | 5160 | |
| 20 rpm | 3940 | |
| 50 rpm | 3104 | |
| 100 rpm | 2668 | |

Example 41

Various a high temperature liquid resins that when applied to a substrate form a high temperature crack resistant coating. The resin can also service as a base or other component in a paint and more complex coating formulations having pigments and other components. The resins had the following formulations.

| | Weight in lbs | | | | | | |
|---|---|---|---|---|---|---|---|
| Material | Ex 40a | Ex 40b | Ex 40c | Ex 40d | Ex 40e | Ex 40f | Ex 40g |
| MHF | 166.76 | 166.76 | 166.76 | 242.56 | 257.72 | 272.88 | 212.24 |
| TV | | 30.32 | 30.32 | 60.64 | 45.48 | 30.32 | 60.64 |
| VMF | 136.44 | 106.12 | 106.12 | | | | 30.32 |
| Octyl tri-ethoxysilane | 60.9 | 60.9 | 60.9 | 60.9 | 60.9 | 60.9 | 60.9 |
| GF-001 glass flake | 97.4 | 97.4 | 97.4 | 97.4 | 97.4 | 97.4 | 97.4 |
| Imerys C-3000 Mica | 105.7 | 105.7 | 105.7 | 105.7 | 105.7 | 105.7 | 105.7 |
| Total weight lbs | 567.2 | 567.2 | 567.2 | 567.2 | 567.2 | 567.2 | 567.2 |
| Catalyst | 3 | 3 | 3 | 3 | 3 | 3 | 3 |
| Viscosity in cps (prior to catalyst addition) | | | | | | | |
| 10 rpm | 2660 | 2720 | | 480 | 480 | 470 | 280 |
| 20 rpm | 1990 | 1940 | | 260 | 270 | 275 | 200 |
| 50 rpm | 1556 | 1380 | | 192 | 196 | 204 | 192 |
| 100 rpm | 1326 | 1088 | | 194 | 196 | 203 | 220 |

Example 42

The high temperature liquid resin Ex 40a was cured into a 4 mil thick coating on a substrate. The coating has a pencil hardness of HB, a Gloss 20' of 1.8 and a Gloss 60" of 14.5.

Example 43

The high temperature liquid resin Ex 40b was cured into a 4.5 mil thick coating on a substrate. The coating has a pencil hardness of B, a Gloss 20' of 1.9 and a Gloss 60" of 13.8.

Example 44

The high temperature liquid resin Ex 40d was cured into a 4 mil thick coating on a substrate. The coating has a pencil hardness of 5B, a Gloss 20' of 2 and a Gloss 60" of 14.

Example 45

The high temperature liquid resin Ex 40e was cured into a 5 mil thick coating on a substrate. The coating has a pencil hardness of 6B, a Gloss 20' of 1.8 and a Gloss 60" of 13.3.

Example 46

The high temperature liquid resin Ex 40f was cured into a 5 mil thick coating on a substrate. The coating has a pencil hardness of 6B, a Gloss 20' of 2 and a Gloss 60" of 15.

Example 47

A high temperature liquid resin that when applied to a substrate forms a high temperature crack resistant coating. The resin can also service as a base or other component in a paint and more complex coating formulations having pigments and other components. The liquid resin has a polysilocarb based part that is 65/35 MHF/VMF. To this part 10%, 20% and 30 by weight of a filler can be added. The filler being 50:50 mica:glass flake.

Example 48

A high temperature liquid resin that when applied to a substrate forms a high temperature crack resistant coating. The resin can also service as a base or other component in a paint and more complex coating formulations having pigments and other components. The liquid resin has a polysilocarb based part that is 60/40 MHF/VMF. To this part 10%, 20% and 40% by weight of a filler can be added. The filler being 50:50 mica:glass flake.

Overview—Polysilocarb Formulations

Formulations, processes, methods and compositions for various polysilocarbs are taught and disclosed in U.S. Pat. Nos. 9,499,677, 9,481,781 and US Patent Publication Nos. 2014/0274658, 2014/0326453, 2015/0175750 and 2015/0252171, the entire disclosure of each of which are incorporated herein by reference, and which disclosures are also generally set forth in this section of the specification.

General Processes for Obtaining a Polysilocarb Precursor

Typically polymer derived ceramic precursor formulations, and in particular polysilocarb precursor formulations can generally be made by three types of processes, although other processes, and variations and combinations of these processes may be utilized. These processes generally involve combining precursors to form a precursor formulation. One type of process generally involves the mixing together of precursor materials in preferably a solvent free process with essentially no chemical reactions taking place, e.g., "the mixing process." The other type of process generally involves chemical reactions, e.g., "the reaction type process," to form specific, e.g., custom, precursor formulations, which could be monomers, dimers, trimers and polymers. A third type of process has a chemical reaction of two or more components in a solvent free environment, e.g., "the reaction blending type process." Generally, in the mixing process essentially all, and preferably all, of the chemical reactions take place during subsequent processing, such as during curing, pyrolysis and both.

It should be understood that these terms—reaction type process, reaction blending type process, and the mixing type process—are used for convenience and as a short hand reference. These terms are not, and should not be viewed as, limiting. For example, the reaction process can be used to create a precursor material that is then used in the mixing process with another precursor material.

These process types are described in this specification, among other places, under their respective headings. It should be understood that the teachings for one process, under one heading, and the teachings for the other processes, under the other headings, can be applicable to each other, as well as, being applicable to other sections, embodiments and teachings in this specification, and vice versa. The starting or precursor materials for one type of process may be used in the other type of processes. Further, it should be understood that the processes described under these headings should be read in context with the entirely of this specification, including the various examples and embodiments.

It should be understood that combinations and variations of these processes may be used in reaching a precursor formulation, and in reaching intermediate, end and final products. Depending upon the specific process and desired features of the product the precursors and starting materials for one process type can be used in the other. A formulation from the mixing type process may be used as a precursor, or component in the reaction type process, or the reaction blending type process. Similarly, a formulation from the reaction type process may be used in the mixing type process and the reaction blending process. Similarly, a formulation from the reaction blending type process may be used in the mixing type process and the reaction type process. Thus, and preferably, the optimum performance and features from the other processes can be combined and utilized to provide a cost effective and efficient process and end product. These processes provide great flexibility to create custom features for intermediate, end, and final products, and thus, any of these processes, and combinations of them, can provide a specific predetermined product. In selecting which type of process is preferable, factors such as cost, controllability, shelf life, scale up, manufacturing ease, etc., can be considered.

The Mixing Type Process

Precursor materials may be methyl hydrogen, and substituted and modified methyl hydrogens, siloxane backbone additives, reactive monomers, reaction products of a siloxane backbone additive with a silane modifier or an organic modifier, and other similar types of materials, such as silane based materials, silazane based materials, carbosilane based materials, phenol/formaldehyde based materials, and combinations and variations of these. The precursors are preferably liquids at room temperature, although they may be solids that are melted, or that are soluble in one of the other precursors. (In this situation, however, it should be understood that when one precursor dissolves another, it is nevertheless not considered to be a "solvent" as that term is used with respect to the prior art processes that employ non-constituent solvents, e.g., solvents that do not form a part or component of the end product, are treated as waste products, and both.)

The precursors are mixed together in a vessel, preferably at room temperature. Preferably, little, and more preferably no solvents, e.g., water, organic solvents, polar solvents, non-polar solvents, hexane, THF, toluene, are added to this mixture of precursor materials. Preferably, each precursor material is miscible with the others, e.g., they can be mixed at any relative amounts, or in any proportions, and will not separate or precipitate. At this point the "precursor mixture" or "polysilocarb precursor formulation" is compete (noting that if only a single precursor is used the material would simply be a "polysilocarb precursor" or a "polysilocarb precursor formulation" or a "formulation"). Although complete, fillers and reinforcers may be added to the formulation. In preferred embodiments of the formulation, essentially no, and more preferably no chemical reactions, e.g., crosslinking or polymerization, takes place within the formulation, when the formulation is mixed, or when the formulation is being held in a vessel, on a prepreg, or over a time period, prior to being cured.

The precursors can be mixed under numerous types of atmospheres and conditions, e.g., air, inert, $N_2$, Argon, flowing gas, static gas, reduced pressure, elevated pressure, ambient pressure, and combinations and variations of these.

Additionally, inhibitors such as cyclohexane, 1-Ethynyl-1-cyclohexanol (which may be obtained from ALDRICH), Octamethylcyclotetrasiloxane, and tetramethyltetravinylcyclotetrasiloxane, may be added to the polysilocarb precursor formulation, e.g., an inhibited polysilocarb precursor formulation. It should be noted that tetramethyltetravinylcyclotetrasiloxane may act as both a reactant and a reaction retardant (e.g., an inhibitor), depending upon the amount present and temperature, e.g., at room temperature it is a retardant and at elevated temperatures it is a reactant. Other materials, as well, may be added to the polysilocarb precursor formulation, e.g., a filled polysilocarb precursor formulation, at this point in processing, including fillers such as SiC powder, carbon black, sand, polymer derived ceramic particles, pigments, particles, nano-tubes, whiskers, or other materials, discussed in this specification or otherwise known to the arts. Further, a formulation with both inhibitors and fillers would be considered an inhibited, filled polysilocarb precursor formulation.

A catalyst or initiator may be used, and can be added at the time of, prior to, shortly before, or at an earlier time before the precursor formulation is formed or made into a structure, prior to curing. The catalysis assists in, advances, and promotes the curing of the precursor formulation to form a preform.

The catalyst can be any platinum (Pt) based catalyst, which can, for example, be diluted to a ranges of: about 0.01 parts per million (ppm) Pt to about 250 ppm Pt, about 0.03 ppm Pt, about 0.1 ppm Pt, about 0.2 ppm Pt, about 0.5 ppm Pt, about 0.02 to 0.5 ppm Pt, about 1 ppm to 200 ppm Pt and preferably, for some applications and embodiments, about 5 ppm to 50 ppm Pt. The catalyst can be a peroxide based catalyst with, for example, a 10 hour half life above 90 C at a concentration of between 0.1% to 3% peroxide, and about 0.5% and 2% peroxide. It can be an organic based peroxide. It can be any organometallic catalyst capable of reacting with Si—H bonds, Si—OH bonds, or unsaturated carbon bonds, these catalysts may include: dibutyltin dilaurate, zinc octoate, peroxides, organometallic compounds of for example titanium, zirconium, rhodium, iridium, palladium, cobalt or nickel. Catalysts may also be any other rhodium, rhenium, iridium, palladium, nickel, and ruthenium type or based catalysts. Combinations and variations of these and other catalysts may be used. Catalysts may be obtained from ARKEMA under the trade name LUPEROX, e.g., LUPEROX 231; and from Johnson Matthey under the trade names: Karstedt's catalyst, Ashby's catalyst, Speier's catalyst.

Further, custom and specific combinations of these and other catalysts may be used, such that they are matched to specific formulations, and in this way selectively and specifically catalyze the reaction of specific constituents. Moreover, the use of these types of matched catalyst-formulations systems may be used to provide predetermined product features, such as for example, pore structures, porosity, densities, density profiles, high purity, ultra high purity, and other morphologies or features of cured structures and ceramics.

In this mixing type process for making a precursor formulation, preferably chemical reactions or molecular rearrangements only take place during the making of the starting materials, the curing process, and in the pyrolizing process. Preferably, in the embodiments of these mixing type of formulations and processes, polymerization, crosslinking or other chemical reactions take place primarily, preferably essentially, and more preferably solely during the curing process.

The precursor may be a siloxane backbone additive, such as methyl terminated hydride substituted polysiloxane, which can be referred to herein as methyl hydrogen (MH), having the formula shown below.

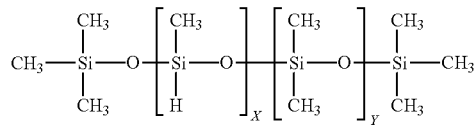

The MH may have a molecular weight ("mw" which can be measured as weight averaged molecular weight in amu or as g/mol) from about 400 mw to about 10,000 mw, from about 600 mw to about 3,000 mw, and may have a viscosity preferably from about 20 cps to about 60 cps. The percentage of methylsiloxane units "X" may be from 1% to 100%. The percentage of the dimethylsiloxane units "Y" may be from 0% to 99%. This precursor may be used to provide the backbone of the cross-linked structures, as well as, other features and characteristics to the cured preform and ceramic material. This precursor may also, among other things, be modified by reacting with unsaturated carbon compounds to produce new, or additional, precursors. Typically, methyl hydrogen fluid (MHF) has minimal amounts of "Y", and more preferably "Y" is for all practical purposes zero.

The precursor may be a siloxane backbone additive, such as vinyl substituted polydimethyl siloxane, which formula is shown below.

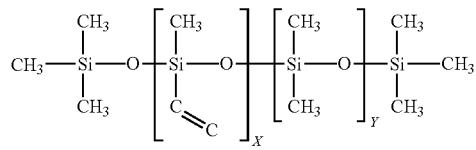

This precursor may have a molecular weight (mw) from about 400 mw to about 10,000 mw, and may have a viscosity preferably from about 50 cps to about 2,000 cps. The percentage of methylvinylsiloxane units "X" may be from 1% to 100%. The percentage of the dimethylsiloxane units "Y" may be from 0% to 99%. Preferably, X is about 100%. This precursor may be used to decrease cross-link density and improve toughness, as well as, other features and characteristics to the cured preform and ceramic material.

The precursor may be a siloxane backbone additive, such as vinyl substituted and vinyl terminated polydimethyl siloxane, which formula is shown below.

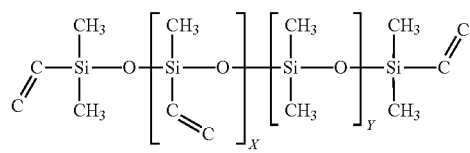

This precursor may have a molecular weight (mw) from about 500 mw to about 15,000 mw, and may preferably have a molecular weight from about 500 mw to 1,000 mw, and may have a viscosity preferably from about 10 cps to about 200 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a siloxane backbone additive, such as vinyl substituted and hydrogen terminated polydimethyl siloxane, which formula is shown below.

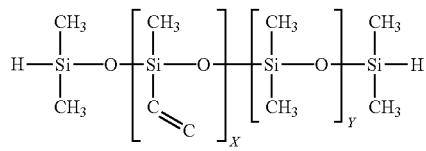

This precursor may have a molecular weight (mw) from about 300 mw to about 10,000 mw, and may preferably have a molecular weight from about 400 mw to 800 mw, and may have a viscosity preferably from about 20 cps to about 300 cps. The percentage of methylvinylsiloxane units "X" may be from 1% to 100%. The percentage of the dimethylsiloxane units "Y" may be from 0% to 99%. This precursor may be used to provide branching and decrease the cure temperature, as well as, other features and characteristics to the cured preform and ceramic material.

The precursor may be a siloxane backbone additive, such as allyl terminated polydimethyl siloxane, which formula is shown below.

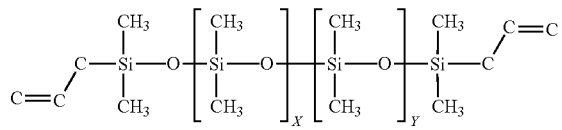

This precursor may have a molecular weight (mw) from about 400 mw to about 10,000 mw, and may have a viscosity preferably from about 40 cps to about 400 cps. The repeating units are the same. This precursor may be used to provide UV curability and to extend the polymeric chain, as well as, other features and characteristics to the cured preform and ceramic material.

The precursor may be a siloxane backbone additive, such as vinyl terminated polydimethyl siloxane ("VT"), which formula is shown below.

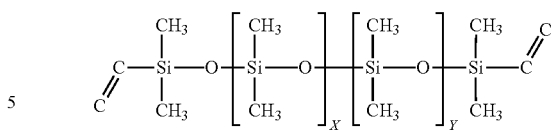

This precursor may have a molecular weight (mw) from about 200 mw to about 5,000 mw, and may preferably have a molecular weight from about 400 mw to 1,500 mw, and may have a viscosity preferably from about 10 cps to about 400 cps. The repeating units are the same. This precursor may be used to provide a polymeric chain extender, improve toughness and to lower cure temperature down to for example room temperature curing, as well as, other features and characteristics to the cured preform and ceramic material.

The precursor may be a siloxane backbone additive, such as silanol (hydroxy) terminated polydimethyl siloxane, which formula is shown below.

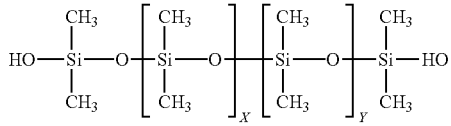

This precursor may have a molecular weight (mw) from about 400 mw to about 10,000 mw, and may preferably have a molecular weight from about 600 mw to 1,000 mw, and may have a viscosity preferably from about 30 cps to about 400 cps. The repeating units are the same. This precursor may be used to provide a polymeric chain extender, a toughening mechanism, can generate nano- and micro-scale porosity, and allows curing at room temperature, as well as other features and characteristics to the cured preform and ceramic material.

The precursor may be a siloxane backbone additive, such as silanol (hydroxy) terminated vinyl substituted dimethyl siloxane, which formula is shown below.

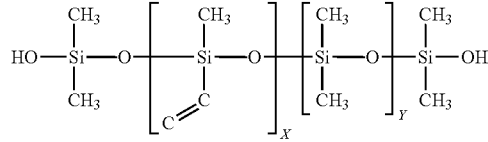

This precursor may have a molecular weight (mw) from about 400 mw to about 10,000 mw, and may preferably have a molecular weight from about 600 mw to 1,000 mw, and may have a viscosity preferably from about 30 cps to about 400 cps. The percentage of methylvinylsiloxane units "X" may be from 1% to 100%. The percentage of the dimethylsiloxane units "Y" may be from 0% to 99%. This precursor may be used, among other things, in a dual-cure system; in this manner the dual-cure can allow the use of multiple cure mechanisms in a single formulation. For example, both condensation type cure and addition type cure can be utilized. This, in turn, provides the ability to have complex cure profiles, which for example may provide for an initial cure via one type of curing and a final cure via a separate type of curing.

The precursor may be a siloxane backbone additive, such as hydrogen (hydride) terminated polydimethyl siloxane, which formula is shown below.

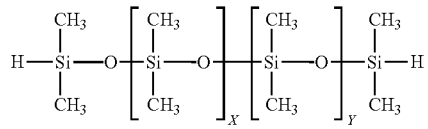

This precursor may have a molecular weight (mw) from about 200 mw to about 10,000 mw, and may preferably have a molecular weight from about 500 mw to 1,500 mw, and may have a viscosity preferably from about 20 cps to about 400 cps. The repeating units are the same. This precursor may be used to provide a polymeric chain extender, as a toughening agent, and it allows lower temperature curing, e.g., room temperature, as well as, other features and characteristics to the cured preform and ceramic material.

The precursor may be a siloxane backbone additive, such as di-phenyl terminated siloxane (which may also be referred to as phenyl terminated), which formula is shown below.

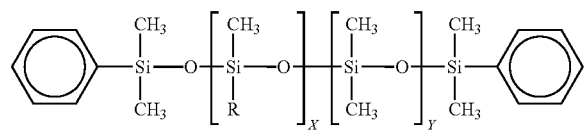

Where here R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent, and to adjust the refractive index of the polymer to match the refractive index of various types of glass, to provide for example transparent fiberglass, as well as, other features and characteristics to the cured preform and ceramic material.

The precursor may be a siloxane backbone additive, such as a mono-phenyl terminated siloxane (which may also be referred to as trimethyl terminated, phenyl terminated siloxane), which formulas are shown below.

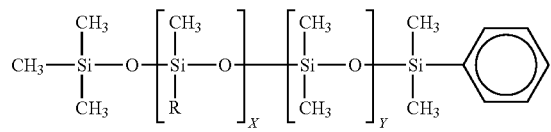

Where R is a reactive group, such as vinyl, hydroxy, or hydride. This precursor may have a molecular weight (mw) from about 500 mw to about 2,000 mw, and may have a viscosity preferably from about 80 cps to about 300 cps. The percentage of methyl-R-siloxane units "X" may be from 1% to 100%. The percentage of the dimethylsiloxane units "Y" may be from 0% to 99%. This precursor may be used to provide a toughening agent and to adjust the refractive index of the polymer to match the refractive index of various types of glass, to provide for example transparent fiberglass, as well as, other features and characteristics to the cured preform and ceramic material.

The precursor may be a siloxane backbone additive, such as diphenyl dimethyl polysiloxane, which formula is shown below.

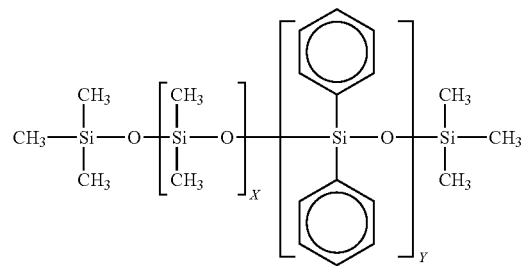

This precursor may have a molecular weight (mw) from about 500 mw to about 20,000 mw, and may have a molecular weight from about 800 to about 4,000, and may have a viscosity preferably from about 100 cps to about 800 cps. The percentage of dimethylsiloxane units "X" may be from 25% to 95%. The percentage of the diphenyl siloxane units "Y" may be from 5% to 75%. This precursor may be used to provide similar characteristics to the mono-phenyl terminated siloxane, as well as, other features and characteristics to the cured preform and ceramic material.

The precursor may be a siloxane backbone additive, such as vinyl terminated diphenyl dimethyl polysiloxane, which formula is shown below.

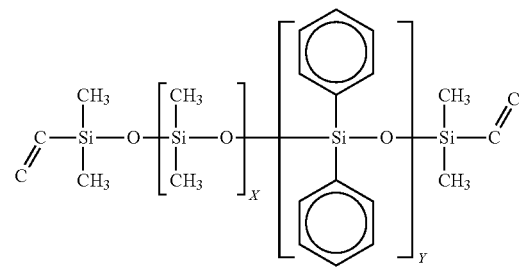

This precursor may have a molecular weight (mw) from about 400 mw to about 20,000 mw, and may have a molecular weight from about 800 to about 2,000, and may have a viscosity preferably from about 80 cps to about 600 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, as well as, other features and characteristics to the cured preform and ceramic material.

The precursor may be a siloxane backbone additive, such as hydroxy terminated diphenyl dimethyl polysiloxane, which formula is shown below.

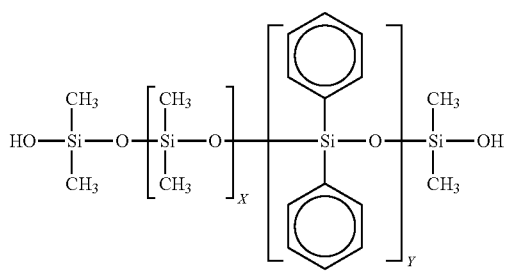

This precursor may have a molecular weight (mw) from about 400 mw to about 20,000 mw, and may have a molecular weight from about 800 to about 2,000, and may have a viscosity preferably from about 80 cps to about 400 cps. The percentage of dimethylsiloxane units "X" may be from 25% to 95%. The percentage of the diphenyl siloxane units "Y" may be from 5% to 75%. This precursor may be used to provide chain extension, toughening agent, changed or altered refractive index, and improvements to high temperature thermal stability of the cured material, can generate nano- and micro-scale porosity, as well as other features and characteristics to the cured preform and ceramic material.

This precursor may be a siloxane backbone additive, such as methyl terminated phenylethyl polysiloxane, (which may also be referred to as styrene vinyl benzene dimethyl polysiloxane), which formula is shown below.

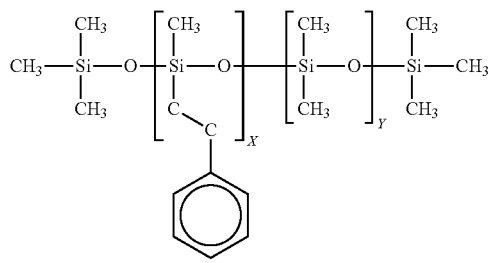

This precursor may have a molecular weight (mw) may be from about 800 mw to at least about 10,000 mw to at least about 20,000 mw, and may have a viscosity preferably from about 50 cps to about 350 cps. The percentage of styrene vinyl benzene siloxane units "X" may be from 1% to 60%. The percentage of the dimethylsiloxane units "Y" may be from 40% to 99%. This precursor may be used to provide improved toughness, decreases reaction cure exotherm, may change or alter the refractive index, adjust the refractive index of the polymer to match the refractive index of various types of glass, to provide for example transparent fiberglass, as well as, other features and characteristics to the cured preform and ceramic material.

A variety of cyclosiloxanes can be used as reactive molecules in the formulation. They can be described by the following nomenclature system or formula: $D_xD^*_y$, where "D" represents a dimethyl siloxy unit and "D*" represents a substituted methyl siloxy unit, where the "*" group could be vinyl, allyl, hydride, hydroxy, phenyl, styryl, alkyl, cyclopentadienyl, or other organic group, x is from 0-8, y is $>=1$, and x+y is from 3-8.

The precursor batch may also contain non-silicon based cross-linking agents, be the reaction product of a non-silicon based cross linking agent and a siloxane backbone additive, and combinations and variation of these. The non-silicon based cross-linking agents are intended to, and provide, the capability to cross-link during curing. For example, non-silicon based cross-linking agents that can be used include: cyclopentadiene (CP), methylcyclopentadiene (MeCP), dicyclopentadiene ("DCPD"), methyldicyclopentadiene (MeDCPD), tricyclopentadiene (TCPD), piperylene, divnylbenzene, isoprene, norbornadiene, vinylnorbornene, propenylnorbornene, isopropenylnorbornene, methylvinylnorbornene, bicyclononadiene, methylbicyclononadiene, propadiene, 4-vinylcyclohexene, 1,3-heptadiene, cycloheptadiene, 1,3-butadiene, cyclooctadiene and isomers thereof. Generally, any hydrocarbon that contains two (or more) unsaturated, C=C, bonds that can react with a Si—H, Si—OH, or other Si bond in a precursor, can be used as a cross-linking agent. Some organic materials containing oxygen, nitrogen, and sulphur may also function as cross-linking moieties.

The amount of the non-silicon based cross-linking agent precursor to the silicon backbone based precursor materials can be from about: (i) 10% to 90% non-silicon based cross-linker; to (ii) 90% to 10% silicon backbone based precursor material. Thus, for example, DCPD/MHF from 10/90 to 90/10, about 40/60 to 60/40, and about 50/50, among other ratios, are contemplated. A third and fourth precursor material may also be used. Thus, the ratio of Non-silicon cross linker/Silicon backbone/third precursor; can be from about 10/20/70 to 70/20/10, from about 10/20/70 to 10/70/20, and from about 45/55/10 to about 55/45/10 and combinations and variations of these ratios.

The precursor may be a reactive monomer. These would include molecules, such as tetramethyltetravinylcyclotetrasiloxane ("TV"), which formula is shown below.

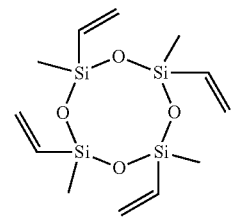 [SMILES: C=C[Si]1(C)O[Si](C)(C=C)O[Si](C)(C=C)O[Si](C)(C=C)O1]

This precursor may be used to provide a branching agent, a three-dimensional cross-linking agent, as well as, other features and characteristics to the cured preform and ceramic material. (It is also noted that in certain formulations, e.g., above 2%, and certain temperatures, e.g., about from about room temperature to about 60° C., this precursor may act as an inhibitor to cross-linking, e.g., in may inhibit the cross-linking of hydride and vinyl groups.)

The precursor may be a reactive monomer, for example, such as trivinyl cyclotetrasiloxane,

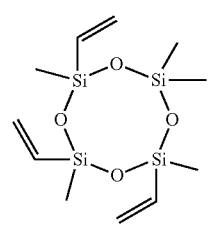 [SMILES: C=C[Si]1(C)O[Si](C)(C)O[Si](C)(C=C)O[Si](C)(C=C)O1]

divinyl cyclotetrasiloxane,

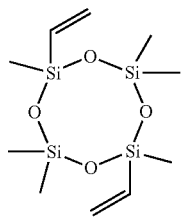

trivinyl monohydride cyclotetrasiloxane,

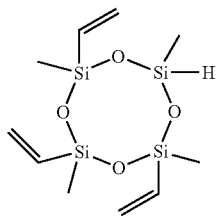 [SMILES: C=C[Si]1(C)O[SiH](C)O[Si](C)(C=C)O[Si](C)(C=C)O1]

divinyl dihydride cyclotetrasiloxane,

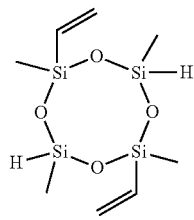 [SMILES: C=C[Si]1(C)O[SiH](C)O[Si](C)(C=C)O[SiH](C)O1]

and a hexamethyl cyclotetrasiloxane, such as,

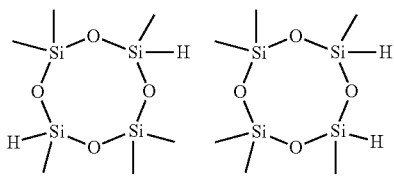

The precursor may be a silane modifier, such as vinyl phenyl methyl silane, diphenyl silane, diphenyl methyl silane, and phenyl methyl silane (some of which may be used as an end capper or end termination group). These silane modifiers can provide chain extenders and branching agents. They also improve toughness, alter refractive index, and improve high temperature cure stability of the cured material, as well as improving the strength of the cured material, among other things. A precursor, such as diphenyl methyl silane, may function as an end capping agent, that may also improve toughness, alter refractive index, and improve high temperature cure stability of the cured material, as well as, improving the strength of the cured material, among other things.

The precursor may be a reaction product of a silane modifier with a vinyl terminated siloxane backbone additive. The precursor may be a reaction product of a silane modifier with a hydroxy terminated siloxane backbone additive. The precursor may be a reaction product of a silane modifier with a hydride terminated siloxane backbone additive. The precursor may be a reaction product of a silane modifier with TV. The precursor may be a reaction product of a silane. The precursor may be a reaction product of a silane modifier with a cyclosiloxane, taking into consideration steric hindrances. The precursor may be a partially hydrolyzed tertraethyl orthosilicate, such as TES 40 or Silbond 40. The precursor may also be a methylsesquisiloxane such as SR-350 available from General Electric Company, Wilton, Conn. The precursor may also be a phenyl methyl siloxane such as 604 from Wacker Chemie AG. The precursor may also be a methylphenylvinylsiloxane, such as H62 C from Wacker Chemie AG.

The precursors may also be selected from the following: SiSiB® HF2020, TRIMETHYLSILYL TERMINATED METHYL HYDROGEN SILICONE FLUID 63148-57-2; SiSiB® HF2050 TRIMETHYLSILYL TERMINATED METHYLHYDROSILOXANE DIMETHYLSILOXANE COPOLYMER 68037-59-2; SiSiB® HF2060 HYDRIDE TERMINATED METHYLHYDROSILOXANE DIMETHYLSILOXANE COPOLYMER 69013-23-6; SiSiB® HF2038 HYDROGEN TERMINATED POLYDIPHENYL SILOXANE; SiSiB® HF2068 HYDRIDE TERMINATED METHYLHYDROSILOXANE DIMETHYLSILOXANE COPOLYMER 115487-49-5; SiSiB® HF2078 HYDRIDE TERMINATED POLY(PHENYLDIMETHYLSILOXY) SILOXANE PHENYL SILSESQUIOXANE, HYDROGEN-TERMINATED 68952-30-7; SiSiB® VF6060 VINYLDIMETHYL TERMINATED VINYLMETHYL DIMETHYL POLYSILOXANE COPOLYMERS 68083-18-1; SiSiB® VF6862 VINYLDIMETHYL TERMINATED DIMETHYL DIPHENYL POLYSILOXANE COPOLYMER 68951-96-2; SiSiB® VF6872 VINYLDIMETHYL TERMINATED DIMETHYL-METHYLVINYL-DIPHENYL POLYSILOXANE COPOLYMER; SiSiB® PC9401 1,1,3,3-TETRAMETHYL-1,3-DIVINYLDISILOXANE 2627-95-4; SiSiB® PF1070 SILANOL TERMINATED POLYDIMETHYLSILOXANE (OF1070) 70131-67-8; SiSiB® OF1070 SILANOL TERMINATED POLYDIMETHYSILOXANE 70131-67-8; OH-ENDCAPPED POLYDIMETHYLSILOXANE HYDROXY TERMINATED OLYDIMETHYLSILOXANE 73138-87-1; SiSiB® VF6030 VINYL TERMINATED POLYDIMETHYL SILOXANE 68083-19-2; and, SiSiB® HF2030 HYDROGEN TERMINATED POLYDIMETHYLSILOXANE FLUID 70900-21-9.

Thus, in additional to the forgoing type of precursors, it is contemplated that a precursor may be a compound of the following general formula.

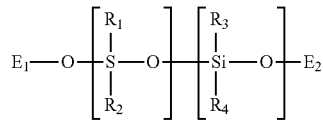

Wherein end cappers $E_1$ and $E_2$ are chosen from groups such as trimethyl silicon (—Si(CH$_3$)$_3$), dimethyl silicon hydroxy (—Si(CH$_3$)$_2$OH), dimethyl silicon hydride (—Si(CH$_3$)$_2$H), dimethyl vinyl silicon (—Si(CH$_3$)$_2$(CH=CH$_2$)), (—Si(CH$_3$)$_2$(C$_6$H$_5$)) and dimethyl alkoxy silicon (—Si(CH$_3$)$_2$(OR). The R groups $R_1$, $R_2$, $R_3$, and $R_4$ may all be different, or one or more may be the same. Thus, for example, $R_2$ is the same as $R_3$, $R_3$ is the same as $R_4$, $R_1$ and $R_2$ are different with $R_3$ and $R_4$ being the same, etc. The R groups are chosen from groups such as hydride (—H), methyl (Me)(—C), ethyl (—C—C), vinyl (—C=C), alkyl (—R)($C_nH_{2n+1}$), allyl (—C—C=C), aryl ('R), phenyl (Ph) (—$C_6H_5$), methoxy (—O—C), ethoxy (—O—C—C), siloxy (—O—Si—$R_3$), alkoxy (—O—R), hydroxy (—O—H), phenylethyl (—C—C—$C_6H_5$) and methyl,phenyl-ethyl (—C—C(—C)(—$C_6H_5$)).

In general, embodiments of formulations for polysilocarb formulations may for example have from about 0% to 50% MH, about 20% to about 99% MH, about 0% to about 30% siloxane backbone additives, about 1% to about 60% reactive monomers, about 30% to about 100% TV, and, about 0% to about 90% reaction products of a siloxane backbone additives with a silane modifier or an organic modifier reaction products.

In mixing the formulations sufficient time should be used to permit the precursors to become effectively mixed and dispersed. Generally, mixing of about 15 minutes to an hour is sufficient. Typically, the precursor formulations are relatively, and essentially, shear insensitive, and thus the type of pumps or mixing are not critical. It is further noted that in higher viscosity formulations additional mixing time may be required. The temperature of the formulations, during mixing should preferably be kept below about 45° C., and preferably about 10° C. (It is noted that these mixing conditions are for the pre-catalyzed formulations.)

The Reaction Type Process

In the reaction type process, in general, a chemical reaction is used to combine one, two or more precursors, typically in the presence of a solvent, to form a precursor formulation that is essentially made up of a single polymer that can then be, catalyzed, cured and pyrolized. This process provides the ability to build custom precursor formulations that when cured can provide plastics having unique and desirable features such as high temperature, flame resistance and retardation, strength and other features. The cured materials can also be pyrolized to form ceramics having unique features. The reaction type process allows for the predetermined balancing of different types of functionality in the end product by selecting functional groups for incorporation into the polymer that makes up the precursor formulation, e.g., phenyls which typically are not used for ceramics but have benefits for providing high temperature capabilities for plastics, and styrene which typically does not provide high temperature features for plastics but provides benefits for ceramics.

In general a custom polymer for use as a precursor formulation is made by reacting precursors in a condensation reaction to form the polymer precursor formulation. This precursor formulation is then cured into a preform through a hydrolysis reaction. The condensation reaction forms a polymer of the type shown below.

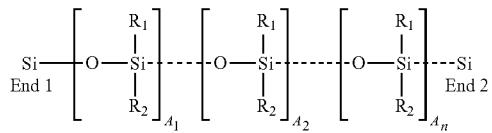

Where $R_1$ and $R_2$ in the polymeric units can be a hydride (—H), a methyl (Me)(—C), an ethyl (—C—C), a vinyl (—C=C), an alkyl (—R)($C_nH_{2n+1}$), an unsaturated alkyl (—$C_nH_{2n-1}$), a cyclic alkyl (—$C_nH_{2n-1}$), an allyl (—C—C=C), a butenyl (—$C_4H_7$), a pentenyl (—$C_5H_9$), a cyclopentenyl (—$C_5H_7$), a methyl cyclopentenyl (—$C_5H_6(CH_3)$), a norbornenyl (—$C_XH_Y$, where X=7-15 and Y=9-18), an aryl ('R), a phenyl (Ph)(—$C_6H_5$), a cycloheptenyl (—$C_7H_{11}$), a cyclooctenyl (—$C_8H_{13}$), an ethoxy (—O—C—C), a siloxy (—O—Si—$R_3$), a methoxy (—O—C), an alkoxy (—O—R), a hydroxy, (—O—H), a phenylethyl (—C—C—$C_6H_5$) a methyl,phenyl-ethyl (—C—C(—C)(—$C_6H_5$)) and a vinylphenyl-ethyl (—C—C($C_6H_4$(—C=C))). $R_1$ and $R_2$ may be the same or different. The custom precursor polymers can have several different polymeric units, e.g., $A_1$, $A_2$, $A_n$, and may include as many as 10, 20 or more units, or it may contain only a single unit, for example, MHF made by the reaction process may have only a single unit.

Embodiments may include precursors, which include among others, a triethoxy methyl silane, a diethoxy methyl phenyl silane, a diethoxy methyl hydride silane, a diethoxy methyl vinyl silane, a dimethyl ethoxy vinyl silane, a diethoxy dimethyl silane, an ethoxy dimethyl phenyl silane, a diethoxy dihydride silane, a triethoxy phenyl silane, a diethoxy hydride trimethyl siloxane, a diethoxy methyl trimethyl siloxane, a trimethyl ethoxy silane, a diphenyl diethoxy silane, a dimethyl ethoxy hydride siloxane, and combinations and variations of these and other precursors, including other precursors set forth in this specification.

The end units, Si End 1 and Si End 2, can come from the precursors of dimethyl ethoxy vinyl silane, ethoxy dimethyl phenyl silane, and trimethyl ethoxy silane. Additionally, if the polymerization process is properly controlled a hydroxy end cap can be obtained from the precursors used to provide the repeating units of the polymer.

In general, the precursors are added to a vessel with ethanol (or other material to absorb heat, e.g., to provide thermal mass), an excess of water, and hydrochloric acid (or other proton source). This mixture is heated until it reaches its activation energy, after which the reaction typically is exothermic. Generally, in this reaction the water reacts with an ethoxy group of the silicon of the precursor monomer, forming a hydroxy (with ethanol as the byproduct). Once formed this hydroxy becomes subject to reaction with an ethoxy group on the silicon of another precursor monomer, resulting in a polymerization reaction. This polymerization reaction is continued until the desired chain length(s) is built.

Control factors for determining chain length, among others, are: the monomers chosen (generally, the smaller the monomers the more that can be added before they begin to coil around and bond to themselves); the amount and point in the reaction where end cappers are introduced; and the amount of water and the rate of addition, among others. Thus, the chain lengths can be from about 180 mw (viscosity about 5 cps) to about 65,000 mw (viscosity of about 10,000 cps), greater than about 1000 mw, greater than about 10,000 mw, greater than about 50,000 mw and greater. Further, the polymerized precursor formulation may, and typically does, have polymers of different molecular weights, which can be predetermined to provide formulation, cured, and ceramic product performance features.

Upon completion of the polymerization reaction the material is transferred into a separation apparatus, e.g., a separation funnel, which has an amount of deionized water that, for example, is from about 1.2× to about 1.5× the mass of the material. This mixture is vigorously stirred for about less than 1 minute and preferably from about 5 to 30 seconds. Once stirred the material is allowed to settle and separate, which may take from about 1 to 2 hours. The polymer is the higher density material and is removed from the vessel. This removed polymer is then dried by either warming in a shallow tray at 90° C. for about two hours; or, preferably, is passed through a wiped film distillation apparatus, to remove any residual water and ethanol. Alternatively, sodium bicarbonate sufficient to buffer the aqueous layer to a pH of about 4 to about 7 is added. It is further understood that other, and commercial, manners of mixing, reacting and separating the polymer from the material may be employed.

Preferably a catalyst is used in the curing process of the polymer precursor formulations from the reaction type process. The same polymers, as used for curing the precursor formulations from the mixing type process can be used. It is noted that, generally unlike the mixing type formulations, a catalyst is not necessarily required to cure a reaction type polymer. Inhibitors may also be used. However, if a catalyst is not used, reaction time and rates will be slower. The curing and the pyrolysis of the cured material from the reaction process is essentially the same as the curing and pyrolysis of the cured material from the mixing process and the reaction blending process.

The reaction type process can be conducted under numerous types of atmospheres and conditions, e.g., air, inert, $N_2$, Argon, flowing gas, static gas, reduced pressure, ambient pressure, elevated pressure, and combinations and variations of these.

The Reaction Blending Type Process

In the reaction blending type process precursor are reacted to from a precursor formulation, in the absence of a solvent. For example, an embodiment of a reaction blending type process has a precursor formulation that is prepared from MHF and Dicyclopentadiene ("DCPD"). Using the reactive blending process a MHF/DCPD polymer is created and this polymer is used as a precursor formulation. (It can be used alone to form a cured or pyrolized product, or as a precursor in the mixing or reaction processes.) MHF of known molecular weight and hydride equivalent mass; "P01" (P01 is a 2% Pt(0) tetravinylcyclotetrasiloxane complex in tetravinylcyclotetrasiloxane, diluted 20× with tetravinylcyclotetrasiloxane to 0.1% of Pt(0) complex. In this manner 10 ppm Pt is provided for every 1% loading of bulk cat.) catalyst 0.20 wt % of MHF starting material (with known active equivalent weight), from 40 to 90%; and Dicyclopentadiene with ≥83% purity, from 10 to 60% are utilized. In an embodiment of the process, a sealable reaction vessel, with a mixer, can be used for the reaction. The reaction is conducted in the sealed vessel, in air; although other types of atmosphere can be utilized. Preferably, the reaction is conducted at atmospheric pressure, but higher and lower pressures can be utilized. Additionally, the reaction blending type process can be conducted under numerous types of atmospheres and conditions, e.g., air, inert, $N_2$, Argon, flowing gas, static gas, reduced pressure, ambient pressure, elevated pressure, and combinations and variations of these.

In an embodiment, 850 grams of MHF (85% of total polymer mixture) is added to reaction vessel and heated to about 50° C. Once this temperature is reached the heater is turned off, and 0.20% by weight P01 Platinum catalyst is added to the MHF in the reaction vessel. Typically, upon addition of the catalyst bubbles will form and temp will initially rise approximately 2-20° C.

When the temperature begins to fall, about 150 g of DCPD (15 wt % of total polymer mixture) is added to the reaction vessel. The temperature may drop an additional amount, e.g., around 5-7° C.

At this point in the reaction process the temperature of the reaction vessel is controlled to, maintain a predetermined temperature profile over time, and to manage the temperature increase that may be accompanied by an exotherm. Preferably, the temperature of the reaction vessel is regulated, monitored and controlled throughout the process.

In an embodiment of the MHF/DCPD embodiment of the reaction process, the temperature profile can be as follows: let temperature reach about 80° C. (may take ~15-40 min, depending upon the amount of materials present); temperature will then increase and peak at ~104° C., as soon as temperature begins to drop, the heater set temperature is increased to 100° C. and the temperature of the reaction mixture is monitored to ensure the polymer temp stays above 80° C. for a minimum total of about 2 hours and a maximum total of about 4 hours. After 2-4 hours above 80° C., the heater is turn off, and the polymer is cooled to ambient. It being understood that in larger and smaller batches, continuous, semi-continuous, and other type processes the temperature and time profile may be different.

In larger scale, and commercial operations, batch, continuous, and combinations of these, may be used. Industrial factory automation and control systems can be utilized to control the reaction, temperature profiles and other processes during the reaction.

Table C sets forth various embodiments of reaction blending processes.

TABLE C

| Material Name | degree of polymerization | Equivalents Si/mole | Equivalents O/mole | Equivalents H/mol | Equivalents Vi/mol | Equivalents methyl/mole | Equivalents C/mole | MW | grams/mole of vinyl |
|---|---|---|---|---|---|---|---|---|---|
| tetramethylcyclotetrasiloxane ($D_4$) | 4 | 4 | 4 | 4 | 0 | 4 | 4 | 240.51 | |
| MHF | 33 | 35 | 34 | 33 | 0 | 39 | 39 | 2145.345 | |
| VMF | 5 | 7 | 6 | 0 | 5 | 11 | 21 | 592.959 | 118.59 |
| TV | 4 | 4 | 4 | 0 | 4 | 4 | 12 | 344.52 | 86.13 |
| VT 0200 | 125 | 127 | 126 | 0 | 2 | 254 | 258 | 9451.206 | 4725.60 |
| VT 0020 | 24 | 26 | 25 | 0 | 2 | 52 | 56 | 1965.187 | 982.59 |
| VT 0080 | 79 | 81 | 80 | 0 | 2 | 162 | 166 | 6041.732 | 3020.87 |
| Styrene | | | | | 2 | | | 104.15 | 52.08 |
| Dicyclopentadiene | | | | | 2 | | | 132.2 | 66.10 |
| 1,4-divinylbenzene | | | | | 2 | | | 130.19 | 65.10 |
| isoprene | | | | | 2 | | | 62.12 | 31.06 |
| 1,3 Butadiene | | | | | 2 | | | 54.09 | 27.05 |
| Catalyst 10 ppm Pt | | | | | | | | | |
| Catalyst LP 231 | | | | | | | | | |

In the above table, the "degree of polymerization" is the number of monomer units, or repeat units, that are attached together to from the polymer. "Equivalents_/mol" refers to the molar equivalents. "Grams/mole of vinyl" refers to the amount of a given polymer needed to provide 1 molar equivalent of vinyl functionality. "VMH" refers to methyl vinyl fluid, a linear vinyl material from the ethoxy process, which can be a substitute for TV. The numbers "0200" etc. for VT are the viscosity in centipoise for that particular VT.

Curing and Pyrolysis

Precursor formulations, including the polysiocarb precursor formulations from the above types of processes, as well as others, can be cured to form a solid, semi-sold, or plastic like material. Typically, the precursor formulations are spread, shaped, or otherwise formed into a preform, which would include any volumetric structure, or shape, including thin and thick films. In curing, the polysilocarb precursor formulation may be processed through an initial cure, to provide a partially cured material, which may also be referred to, for example, as a preform, green material, or green cure (not implying anything about the material's color). The green material may then be further cured. Thus, one or more curing steps may be used. The material may be "end cured," i.e., being cured to that point at which the material has the necessary physical strength and other properties for its intended purpose. The amount of curing may be to a final cure (or "hard cure"), i.e., that point at which all, or essentially all, of the chemical reaction has stopped (as measured, for example, by the absence of reactive groups in the material, or the leveling off of the decrease in reactive groups over time). Thus, the material may be cured to varying degrees, depending upon its intended use and purpose. For example, in some situations the end cure and the hard cure may be the same. Curing conditions such as atmosphere and temperature may effect the composition of the cured material.

The curing may be done at standard ambient temperature and pressure ("SATP", 1 atmosphere, 25° C.), at temperatures above or below that temperature, at pressures above or below that pressure, and over varying time periods. The curing can be conducted over various heatings, rate of heating, and temperature profiles (e.g., hold times and temperatures, continuous temperature change, cycled temperature change, e.g., heating followed by maintaining, cooling, reheating, etc.). The time for the curing can be from a few seconds (e.g., less than about 1 second, less than 5 seconds), to less than a minute, to minutes, to hours, to days (or potentially longer). The curing may also be conducted in any type of surrounding environment, including for example, gas, liquid, air, water, surfactant containing liquid, inert atmospheres, $N_2$, Argon, flowing gas (e.g., sweep gas), static gas, reduced $O_2$, reduced pressure, elevated pressure, ambient pressure, controlled partial pressure and combinations and variations of these and other processing conditions. For high purity materials, the furnace, containers, handling equipment, atmosphere, and other components of the curing apparatus and process are clean, essentially free from, and do not contribute any elements or materials, that would be considered impurities or contaminants, to the cured material. In an embodiment, the curing environment, e.g., the furnace, the atmosphere, the container and combinations and variations of these can have materials that contribute to or effect, for example, the composition, catalysis, stoichiometry, features, performance and combinations and variations of these in the preform, the ceramic and the final applications or products.

Preferably, in embodiments of the curing process, the curing takes place at temperatures in the range of from about 5° C. or more, from about 20° C. to about 250° C., from about 20° C. to about 150° C., from about 75° C. to about 125° C., and from about 80° C. to 90° C. Although higher and lower temperatures and various heating profiles, (e.g., rate of temperature change over time ("ramp rate", e.g., Δ degrees/time), hold times, and temperatures) can be utilized.

The cure conditions, e.g., temperature, time, ramp rate, may be dependent upon, and in some embodiments can be predetermined, in whole or in part, by the formulation to match, for example the size of the preform, the shape of the preform, or the mold holding the preform to prevent stress cracking, off gassing, or other phenomena associated with the curing process. Further, the curing conditions may be such as to take advantage of, preferably in a controlled manner, what may have previously been perceived as problems associated with the curing process. Thus, for example, off gassing may be used to create a foam material having either open or closed structure. Similarly, curing conditions can be used to create or control the microstructure and the nanostructure of the material. In general, the curing conditions can be used to affect, control or modify the kinetics and thermodynamics of the process, which can affect morphology, performance, features and functions, among other things.

Upon curing the polysilocarb precursor formulation a cross linking reaction takes place that provides in some embodiments a cross-linked structure having, among other things, an —$R_1$—Si—C—C—Si—O—Si—C—C—Si—$R_2$— where $R_1$ and $R_2$ vary depending upon, and are based upon, the precursors used in the formulation. In an embodiment of the cured materials they may have a cross-linked structure having 3-coordinated silicon centers to another silicon atom, being separated by fewer than 5 atoms between silicons.

During the curing process some formulations may exhibit an exotherm, i.e., a self heating reaction, that can produce a small amount of heat to assist or drive the curing reaction, or that may produce a large amount of heat that may need to be managed and removed in order to avoid problems, such as stress fractures. During the cure off gassing typically occurs and results in a loss of material, which loss is defined generally by the amount of material remaining, e.g., cure yield. Embodiments of the formulations, cure conditions, and polysilocarb precursor formulations of embodiments of the present inventions can have cure yields of at least about 90%, about 92%, about 100%. In fact, with air cures the materials may have cure yields above 100%, e.g., about 101-105%, as a result of oxygen being absorbed from the air. Additionally, during curing the material typically shrinks, this shrinkage may be, depending upon the formulation, cure conditions, and the nature of the preform shape, and whether the preform is reinforced, filled, neat or unreinforced, from about 20%, less than 20%, less than about 15%, less than about 5%, less than about 1%, less than about 0.5%, less than about 0.25% and smaller.

Curing of the coating may be accomplished by any type of heating apparatus, or mechanisms, techniques, or morphologies that has the requisite level of temperature and environmental control, for example, heated water baths, electric furnaces, microwaves, gas furnaces, furnaces, forced heated air, towers, spray drying, falling film reactors, fluidized bed reactors, lasers, indirect heating elements, direct heating, infrared heating, UV irradiation, RF furnace, in-situ during emulsification via high shear mixing, in-situ during emulsification via ultrasonication. In an embodiment, curing may also occur under ambient conditions for an embodiment having a sufficient amount of catalyst.

If pyrolysis is conducted for an embodiment the cured material can be for example heated to about 600° C. to about 2,300° C.; from about 650° C. to about 1,200° C., from about 800° C. to about 1300° C., from about 900° C. to about 1200° C. and from about 950° C. to 1150° C. At these temperatures typically all organic structures are either removed or combined with the inorganic constituents to form a ceramic. Typically at temperatures in the about 650° C. to 1,200° C. range the resulting material is an amorphous glassy ceramic. When heated above about 1,200° C. the material typically may from nano crystalline structures, or micro crystalline structures, such as SiC, $Si_3N_4$, SiCN, β SiC, and above 1,900° C. an α SiC structure may form, and at and above 2,200° C. α SiC is typically formed. The pyrolized, e.g., ceramic materials can be single crystal, polycrystalline, amorphous, and combinations, variations and subgroups of these and other types of morphologies.

The pyrolysis may be conducted under may different heating and environmental conditions, which preferably include thermo control, kinetic control and combinations and variations of these, among other things. For example, the pyrolysis may have various heating ramp rates, heating cycles and environmental conditions. In some embodiments, the temperature may be raised, and held a predetermined temperature, to assist with known transitions (e.g., gassing, volatilization, molecular rearrangements, etc.) and then elevated to the next hold temperature corresponding to the next known transition. The pyrolysis may take place in reducing atmospheres, oxidative atmospheres, low $O_2$, gas rich (e.g., within or directly adjacent to a flame), inert, $N_2$, Argon, air, reduced pressure, ambient pressure, elevated pressure, flowing gas (e.g., sweep gas, having a flow rate for example of from about from about 15.0 GHSV to about 0.1 GHSV, from about 6.3 GHSV to about 3.1 GHSV, and at about 3.9 GHSV), static gas, and combinations and variations of these.

In some embodiments, upon pyrolization, graphenic, graphitic, amorphous carbon structures and combinations and variations of these are present in the Si—O—C ceramic. A distribution of silicon species, consisting of SiOxCy structures, which result in SiO4, SiO3C, SiO2C2, SiOC3, and SiC4 are formed in varying ratios, arising from the precursor choice and their processing history. Carbon is generally bound between neighboring carbons and/or to a Silicon atom. In general, in the ceramic state, carbon is largely not coordinated to an oxygen atom, thus oxygen is largely coordinated to silicon The pyrolysis may be conducted in any heating apparatus, that maintains the request temperature and environmental controls; or upon embodiments of the present coating being expose to flame, or high heat conditions. Thus, for example pyrolysis may be done with gas fired furnaces, electric furnaces, direct heating, indirect heating, fluidized beds, kilns, tunnel kilns, box kilns, shuttle kilns, coking type apparatus, lasers, microwaves, and combinations and variations of these and other heating apparatus and systems that can obtain the request temperatures for pyrolysis.

Metals and Metal Complexes

By way of example, metals and metal complexes that can be used as fill material would include Cyclopentadienyl compounds of the transition metals can be utilized. Cyclopentadienyl compounds of the transition metals can be organized into two classes: Bis-cyclopentadienyl complexes; and Mono-cyclopentadienyl complexes. Cyclopentadienyl complexes can include $C_5H_5$, $C_5Me_5$, $C_5H_4Me$, $CH_5R_5$ (where R=Me, Et, Propyl, i-Propyl, butyl, Isobutyl, Sec-butyl). In either of these cases Si can be directly bonded to the Cyclopentadienyl ligand or the Si center can be attached to an alkyl chain, which in turn is attached to the Cyclopentadienyl ligand.

Cyclopentadienyl complexes, that can be utilized with precursor formulations and in products, can include: bis-cyclopentadienyl metal complexes of first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum); Lanthanide series (La, Ce, Pr, Nd, Pm, Sm, Eu, Gd, Tb, Dy, Ho); and Actinide series (Ac, Th, Pa, U, Np).

Monocyclopentadienyl complexes may also be utilized to provide metal functionality to precursor formulations and would include monocyclopentadienyl complexes of: first row transition metals (Titanium, Vanadium, Chromium, Iron, Cobalt, Nickel); second row transition metals (Zirconium, Molybdenum, Ruthenium, Rhodium, Palladium); third row transition metals (Hafnium, Tantalum, Tungsten, Iridium, Osmium, Platinum) when preferably stabilized with proper ligands, (for instance Chloride or Carbonyl).

Alky complexes of metals may also be used to provide metal functionality to precursor formulations and products. In these alkyl complexes the Si center has an alkyl group (ethyl, propyl, butyl, vinyl, propenyl, butenyl) which can bond to transition metal direct through a sigma bond. Further, this would be more common with later transition metals such as Pd, Rh, Pt, Ir.

Coordination complexes of metals may also be used to provide metal functionality to precursor formulations and products. In these coordination complexes the Si center has an unsaturated alkyl group (vinyl, propenyl, butenyl, acetylene, butadienyl) which can bond to carbonyl complexes or ene complexes of Cr, Mo, W, Mn, Re, Fe, Ru, Os, Co, Rh, Ir, Ni. The Si center may also be attached to a phenyl, substituted phenyl or other aryl compound (pyridine, pyrimidine) and the phenyl or aryl group can displace carbonyls on the metal centers.

Metal alkoxides may also be used to provide metal functionality to precursor formulations and products. Metal alkoxide compounds can be mixed with the Silicon precursor compounds and then treated with water to form the oxides at the same time as the polymer, copolymerize. This can also be done with metal halides and metal amides. Preferably, this may be done using early transition metals along with Aluminum, Gallium and Indium, later transition metals: Fe, Mn, Cu, and alkaline earth metals: Ca, Sr, Ba, Mg.

Compounds where Si is directly bonded to a metal center which is stabilized by halide or organic groups may also be utilized to provide metal functionality to precursor formulations and products.

Additionally, it should be understood that the metal and metal complexes may be the continuous phase after pyrolysis, or subsequent heat treatment. Formulations can be specifically designed to react with selected metals to in situ form metal carbides, oxides and other metal compounds, generally known as cermets (e.g., ceramic metallic compounds). The formulations can be reacted with selected metals to form in situ compounds such as mullite, alumino silicate, and others. The amount of metal relative to the amount of silica in the formulation or end product can be from about 0.1 mole % to 99.9 mole %, about 1 mole % or greater, about 10 mole % or greater, and about 20 mole percent or greater. The forgoing use of metals with the present precursor formulas can be used to control and provide predetermined stoichiometries.

It should be understood that the use of headings in this specification is for the purpose of clarity, and is not limiting in any way. Thus, the processes and disclosures described under a heading should be read in context with the entirely of this specification, including the various examples. The use of headings in this specification should not limit the scope of protection afford the present inventions.

The various embodiments of formulations, plastics, articles, components, coatings, bases, parts, uses, applications, methods, activities and operations set forth in this specification may be used for various other fields and for various other activities, uses and embodiments. Additionally, these embodiments, for example, may be used with: existing systems, articles, components, coatings, bases, operations or activities; may be used with systems, articles, components, coatings, bases, operations or activities that may be developed in the future; and with such systems, articles, components, operations, coatings, bases, or activities that may be modified, in-part, based on the teachings of this specification. Further, the various embodiments and examples set forth in this specification may be used with each other, in whole or in part, and in different and various combinations. Thus, for example, the configurations provided in the various embodiments and examples of this specification may be used with each other; and the scope of protection afforded the present inventions should not be limited to a particular embodiment, example, configuration or arrangement that is set forth in a particular embodiment, example, or in an embodiment in a particular Figure.

The invention may be embodied in other forms than those specifically disclosed herein without departing from its spirit or essential characteristics. The described embodiments are to be considered in all respects only as illustrative and not restrictive.

What is claimed:

1. A liquid composition for forming high temperature crack resistant coatings, the liquid composition comprising:
   methyl hydrogen fluid;
   a polysilocarb having vinyl groups wherein, the polysilocarb has terminating groups selected from the group consisting of dimethyl silicon hydroxy (—Si(CH$_3$)$_2$OH), dimethyl silicon hydride (—Si(CH$_3$)$_2$H), dimethyl vinyl silicon (—Si(CH$_3$)$_2$(CH=CH$_2$)), (—Si(CH$_3$)$_2$(C$_6$H$_5$)) and dimethyl alkoxy silicon (—Si(CH$_3$)$_2$ (OR);
   a filler selected from the group consisting of mullite, pyrophyllite, sillimanite, wollastonite, mica, diatomite, titanium dioxide, borates, boronic acid, chromates, micaceous iron oxide, zinc dust, and zinc silicates;
   a wetting agent for the filler comprising an octyl triethoxysilane or an ethyl trieoxysilane; and,
   a catalyst;
   wherein the composition is configured to form a coating on a substrate, whereby the coating will not have visible cracks under 25× magnification when heated to 300 ° C.

2. The liquid composition of claim 1, wherein the composition is essentially VOC free.

3. The liquid composition of claim 2, comprising at least about 90 percent solids.

4. The liquid composition of claim 2, wherein the composition is capable of forming a coating on a substrate, whereby the coating withstands at least 1,000 hours of continuous exposure to a neutral salt spray at 40° C. without degradation.

5. The liquid composition of claim 2, wherein the composition is capable of forming a coating on a substrate, whereby the coating can withstand a temperature up to at least 1,200° F. with a DE of less than 1.5 color difference.

6. The liquid composition of claim 2, wherein the composition is capable of forming a coating on a substrate, whereby the coating has a pencil hardness of at least 9h.

7. The liquid composition of claim 2, wherein the composition is capable of forming a coating on a substrate, whereby the coating has a pencil hardness of at least 6h.

8. The liquid composition of claim 2, wherein the composition is capable of forming a coating on a substrate, whereby the coating has a pencil hardness of from about 9h to bout 6h.

9. The liquid composition of claim 2, wherein the composition is capable of forming a coating on a substrate, whereby the coating has a scratch resistance of at least about F.

10. The liquid composition of claim 1, wherein the composition is essentially HAP free.

11. The liquid composition of claim 10, comprising at least about 95 percent solids.

12. The liquid composition of claim 1, wherein the composition is essentially TAP free.

13. The liquid composition of claim 12, comprising at least about 99 percent solids.

14. The liquid composition of claim 1 comprising at least about 50% by volume filler.

15. The liquid composition of claim 1 comprising at least about 30% by volume filler.

16. The liquid composition of claim 1 comprising at least about 20% by volume filler.

17. The liquid composition of claim 1, wherein the liquid composition is at least about 90 percent solids.

18. The liquid composition of claim 1 wherein the liquid composition is at least about 95 percent solids.

19. The liquid composition of claim 1, wherein the liquid composition is at least about 99 percent solids.

20. The liquid composition of claim 19, wherein the composition is capable of forming a coating on a substrate, whereby the coating withstands at least 1,000 hours of continuous exposure to a neutral salt spray at 40° C. without degradation.

21. The liquid composition of claim 19, wherein the composition is capable of forming a coating on a substrate, whereby the coating can withstand a temperature up to at least 1,200° F. with a DE of less than 1.5 color difference.

22. The liquid composition of claim 19, wherein the composition is capable of forming a coating on a substrate, whereby the coating has a pencil hardness of at least 9h.

23. The liquid composition of claim 19, wherein the composition is capable of forming a coating on a substrate, whereby the coating has a pencil hardness of at least 6h.

24. The liquid composition of claim 19, wherein the composition is capable of forming a coating on a substrate, whereby the coating has a pencil hardness of from about 9h to about 6h.

25. The liquid composition of claim 19, wherein the composition is capable of forming a coating on a substrate, whereby the coating has a scratch resistance of at least about F.

26. The liquid composition of claim 1, wherein the liquid composition is 100 percent solids.

27. The liquid compositions of claims 1, 2, 10, 18, 19, or 3, whereby the coating will not have visible cracks under 25× magnification when heated to 400° C. for 10 minutes or less.

28. The liquid compositions of claim 1, 12, 14, 17, 19 or 11, whereby the coating will not have visible cracks under 40× magnification when heated to 400° C. for 10 minutes or less.

29. The liquid compositions of claim 1, 2, 10, 12, 14, 17, 18, 19, 3 or 11, whereby the coating will not have visible cracks under 75× magnification when heated to 400° C. for 10 minutes or less.

30. The liquid compositions of claim 1, 17, 18, 19 or 11, whereby the coating will not have visible cracks under 25× magnification when heated to 500° C. for 10 minutes or less.

31. The liquid compositions of claim 1, 16, 18, 19 or 13, whereby the coating will not have visible cracks under 40× magnification when heated to 500° C. for 10 minutes or less.

32. A liquid composition for forming high temperature crack resistant coatings, the liquid composition comprising:
a polysilocarb precursor wherein, the polysilocarb has terminating groups selected from the group consisting of dimethyl silicon hydroxy (—Si(CH$_3$)$_2$OH), dimethyl silicon hydride (—Si(CH$_3$)$_2$H), dimethyl vinyl silicon (—Si(CH$_3$)$_2$(CH=CH$_2$)), (—Si(CH$_3$)$_2$(C$_6$H$_5$)) and dimethyl alkoxy silicon (—Si(CH$_3$)$_2$(OR);
a filler selected from the group consisting of mullite, pyrophyllite, sillimanite, wollastonite, mica, diatomite, titanium dioxide, borates, boronic acid, chromates, micaceous iron oxide, zinc dust, and zinc silicates;
wherein the liquid composition is at least 98 percent solids; and,
wherein the composition is configured to form a coating on a substrate, whereby the coating withstands at least 1,000 hours of continuous exposure to a neutral salt spray at 40° C. without degradation.

33. The liquid composition of claim 1, wherein the composition is capable of forming a coating on a substrate, whereby the coating can withstand a temperature up to at least 1,200 ° F. with a DE of less than 1.5 color difference.

34. The liquid composition of claim 1, wherein the composition is capable of forming a coating on a substrate, whereby the coating has a pencil hardness of at least 6h.

35. The liquid composition of claim 1, wherein the composition is capable of forming a coating on a substrate, whereby the coating has a pencil hardness of from about 9h to about 6h.

36. The liquid composition of claim 1, wherein the composition is capable of forming a coating on a substrate, whereby the coating has a scratch resistance of at least about F.

37. The liquid composition of claim 1, wherein the composition is capable of forming a coating on a substrate, whereby the coating withstands at least 1,000 hours of continuous exposure to a neutral salt spray at 40° C. without degradation.

38. A liquid composition configured to form high temperature crack resistant coating, wherein the coating is crack resistant at temperature of 300° C., the liquid composition comprising:
methyl hydrogen fluid;
a polysilocarb having vinyl groups groups wherein, the polysilocarb has terminating groups selected from the group consisting of dimethyl silicon hydroxy (—Si(CH$_3$)$_2$OH), dimethyl silicon hydride (-Si(CH$_3$)$_2$H), dimethyl vinyl silicon (—Si(CH$_3$)$_2$(CH=CH$_2$)), (—Si(CH$_3$)$_2$(C$_6$H$_5$)) and dimethyl alkoxy silicon (-Si(CH$_3$)$_2$(OR));
at least about 40% by volume of a filler, wherein the filler is selected from the group consisting of mullite, pyrophyllite, sillimanite, wollastonite, mica, diatomite, titanium dioxide, borates, boronic acid, chromates, micaceous iron oxide, zinc dust, and zinc silicates;
the liquid composition defining a viscosity profile of from about 4,000 to 6000 cps at 10 rpm, about 2000 to about 5000 at 20 rpm, about 2000 to about 5000 at 50 rpm, and about 1,500 to about 4000 at 100 rpm; and,
wherein the composition is configured to form a coating on a substrate, wherein the coating is at least about 95 percent solids, whereby the coating will not have visible cracksunder 25× magnification when heated to 300° C.

39. The liquid composition of claim 38, wherein the liquid composition is about 98 percent solids.

40. The liquid compositions of claim 38, wherein the composition is capable of forming a coating on a substrate, whereby the coating will not have visible cracks under 25× magnification when heated to 300° C. for 10 minutes or less.

41. The liquid composition of claim 38, whereby the coating will not have visible cracks under 40× magnification when heated to 400° C. for 10 minutes or less.

42. The liquid composition of claim 38, comprising a filler wetting agent.

43. The liquid composition of claim 42, wherein the filler wetting agent comprises an octyl triethoxysilane having the chemical formula of C$_{14}$H$_{32}$O$_3$Si.

44. The liquid composition of claim 42, wherein the filler wetting agent comprises an ethyl triethoxysilane having the chemical formula of C$_8$H$_{20}$O$_3$Si.

45. A liquid composition for forming high temperature crack resistant coatings, the liquid composition comprising:
a polysilocarb precursor wherein, the polysilocarb has terminating groups selected from the group consisting of dimethyl silicon (—Si(CH$_3$)$_2$OH), dimethyl silicon hydride (—Si(CH$_3$)$_2$H), (—Si(CH$_3$)$_2$(C$_6$H$_5$)) and dimethyl alkoxy silicon (—Si(CH$_3$)$_2$(OR); wherein one or more R groups are selected from the group consisting of hydride (—H), methyl (—C), ethyl (—C—C), alkyl (—R)(C$_n$H$_{2n+1}$), aryl ('R), phenyl (Ph)(—C$_6$H$_5$), methoxy (—O—C), ethoxy (—O—C—C), siloxy (—O—Si—R$_3$), alkoxy (—O—R), hydroxy (—O—H), phenylethyl (—C—C—C$_6$H$_5$) and methylphenylethyl (—C—C(—C)(—C$_6$H$_5$);
at least about 10% filler, wherein the filler is selected from the group consisting of mullite, pyrophyllite, sillimanite, wollastonite, mica, diatomite, titanium dioxide, borates, boronic acid, chromates, micaceous iron oxide, zinc dust, and zinc silicates;
wherein the liquid composition is at least about 95 percent solids; and
wherein, the composition is configured to form a coating on a substrate, whereby the coating will not have visible cracks under 25× magnification when heated to 300° C. for 10 minutesor less.

46. The liquid composition of claim 45, wherein the liquid composition defining a viscosity profile of from about 4,000 to 6000 cps at 10 rpm, about 2000 to about 5000 at 20 rpm, about 2000 to about 5000 at 50 rpm, and about 1,500 to about 4000 at 100 rpm.

47. The liquid composition of claim 32, wherein the coating has a scratch resistance of at least about F.

48. The liquid composition of claim 32, wherein the coating can withstand a temperature up to at least 1,200 ° F. with a DE of less than 1.5 color difference.

49. The liquid composition of claim 32, wherein the coating has a pencil hardness of at least 9h.

50. The liquid composition of claim 32, wherein the coating has a pencil hardness of from about 9h to about 6h.

\* \* \* \* \*

UNITED STATES PATENT AND TRADEMARK OFFICE
CERTIFICATE OF CORRECTION

PATENT NO. : 11,351,652 B2  
APPLICATION NO. : 15/454846  
DATED : June 7, 2022  
INVENTOR(S) : Douglas M. Dukes et al.

Page 1 of 1

It is certified that error appears in the above-identified patent and that said Letters Patent is hereby corrected as shown below:

In the Specification

Column 32, Line 25, the portion of the formula heading "-Si-HO" should read "-Si-OH" as shown below:

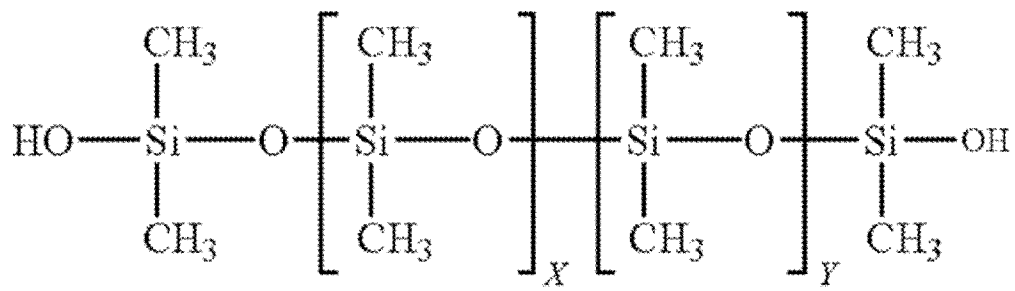

In the Claims

Column 50, Claim 45, Line 40, replace "dimethyl silicon" with --dimethyl silicon hydroxy--

Signed and Sealed this  
Eleventh Day of October, 2022

*Katherine Kelly Vidal*  
Katherine Kelly Vidal  
*Director of the United States Patent and Trademark Office*